(12) United States Patent
Heffernan

(10) Patent No.: US 10,962,163 B2
(45) Date of Patent: Mar. 30, 2021

(54) APPARATUS FOR BLOCKING FLUID FLOW THROUGH PIPES

(71) Applicant: NLB Engineering Limited, Harlow (GB)

(72) Inventor: John Francis Steeple Heffernan, Harlow (GB)

(73) Assignee: NLB Engineering Limited, Harlow (GB)

( * ) Notice: Subject to any disclaimer, the term of this patent is extended or adjusted under 35 U.S.C. 154(b) by 97 days.

(21) Appl. No.: 15/999,857

(22) PCT Filed: Feb. 10, 2017

(86) PCT No.: PCT/GB2017/050362
§ 371 (c)(1),
(2) Date: Aug. 20, 2018

(87) PCT Pub. No.: WO2017/141016
PCT Pub. Date: Aug. 24, 2017

(65) Prior Publication Data
US 2019/0331281 A1    Oct. 31, 2019

(30) Foreign Application Priority Data

Feb. 19, 2016   (GB) ...................................... 1602932
Jan. 27, 2017   (GB) ...................................... 1701402

(51) Int. Cl.
*F16L 55/124*   (2006.01)
*F16L 41/06*    (2006.01)
*F16L 41/16*    (2006.01)

(52) U.S. Cl.
CPC ............ *F16L 55/124* (2013.01); *F16L 41/06* (2013.01); *F16L 41/16* (2013.01); *B23B 2215/72* (2013.01)

(58) Field of Classification Search
CPC .................................. F16L 41/16; F16L 41/06
See application file for complete search history.

(56) References Cited

U.S. PATENT DOCUMENTS 396,177 A     1/1889   Smith
3,269,694 A   8/1966   Hardison
(Continued)

FOREIGN PATENT DOCUMENTS

DE        19629459 A1    1/1998
GB         2344396 A     6/2000
WO      2011/012899 A2   2/2011

OTHER PUBLICATIONS

Chinese First Office Action for Chinese Application No. 201780012183.0 dated Dec. 2, 2019, 14 pages.
(Continued)

*Primary Examiner* — Kevin R Barss
(74) *Attorney, Agent, or Firm* — TraskBritt

(57) ABSTRACT

An apparatus for temporarily blocking fluid flow through a pipe comprises a housing configured to enclose a portion of a pipe and a flow blockage device. The housing includes a first part defining a housing chamber for receiving the pipe, and a second part defining a stowage space adjacent the housing chamber. The flow blockage device is movable through an aperture formed in one side of the pipe to an installed position in the housing chamber. The flow blockage device includes an outer sealing part that is configurable between an unexpanded configuration allowing the flow blockage device to pass through the aperture and allowing fluid flow through the pipe and an expanded configuration configured to block fluid flow through pipe by substantially preventing passage of fluid between outer side surfaces of the flow blockage device and inner surfaces of the pipe.

18 Claims, 17 Drawing Sheets

(56) References Cited

U.S. PATENT DOCUMENTS

| | | | |
|---|---|---|---|
| 3,532,113 | A | 10/1970 | McKean |
| 3,687,166 | A | 8/1972 | Herrin |
| 4,369,813 | A | 1/1983 | Thomas |
| 4,902,174 | A | 2/1990 | Thompson et al. |
| 5,316,037 | A | 5/1994 | Martin |
| 5,964,240 | A | 10/1999 | Granovski |
| 9,687,166 | B2 | 6/2017 | Subramaniam et al. |
| 2004/0112431 | A1 | 6/2004 | Burlock et al. |
| 2006/0000999 | A1* | 1/2006 | Mori .................... F16L 55/124 251/334 |
| 2006/0070659 | A1 | 4/2006 | Nelson et al. |
| 2009/0087273 | A1 | 4/2009 | Allen et al. |

OTHER PUBLICATIONS

European Search Report and Opinion for European Publication No. 17711725.6 dated Jan. 3, 2020, 4 pages.
International Written Opinion for International Application No. PCT/GB2017/050362 dated Sep. 20, 2017, 14 pages.
International Search Report for International Application No. PCT/GB2017/050362 dated Sep. 20, 2017, 7 pages.

* cited by examiner

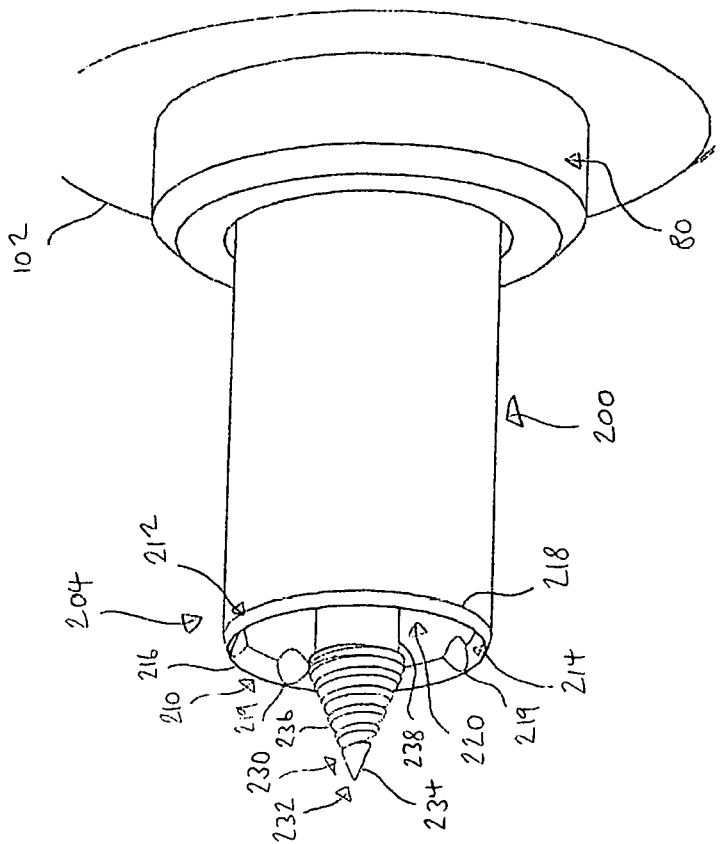
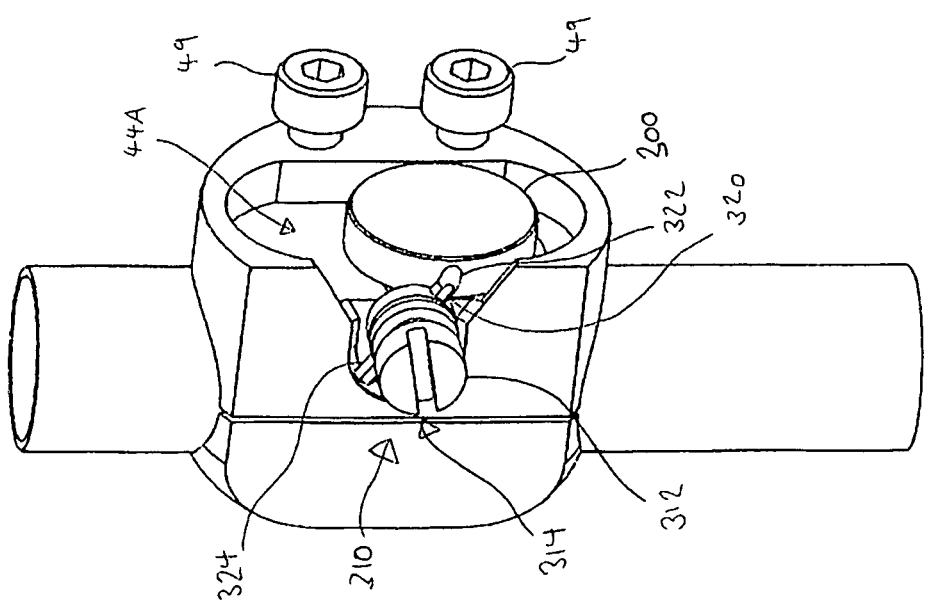

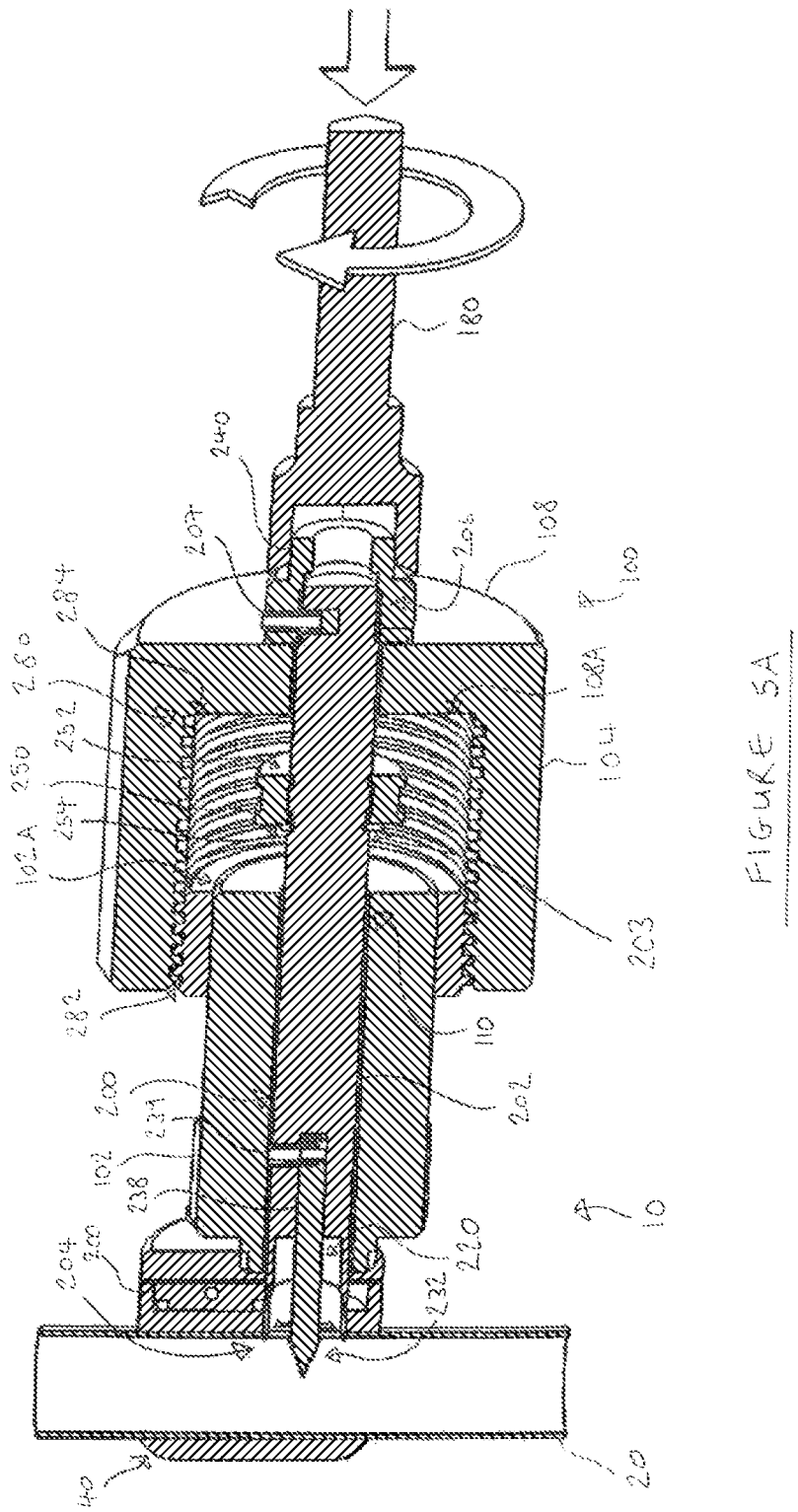

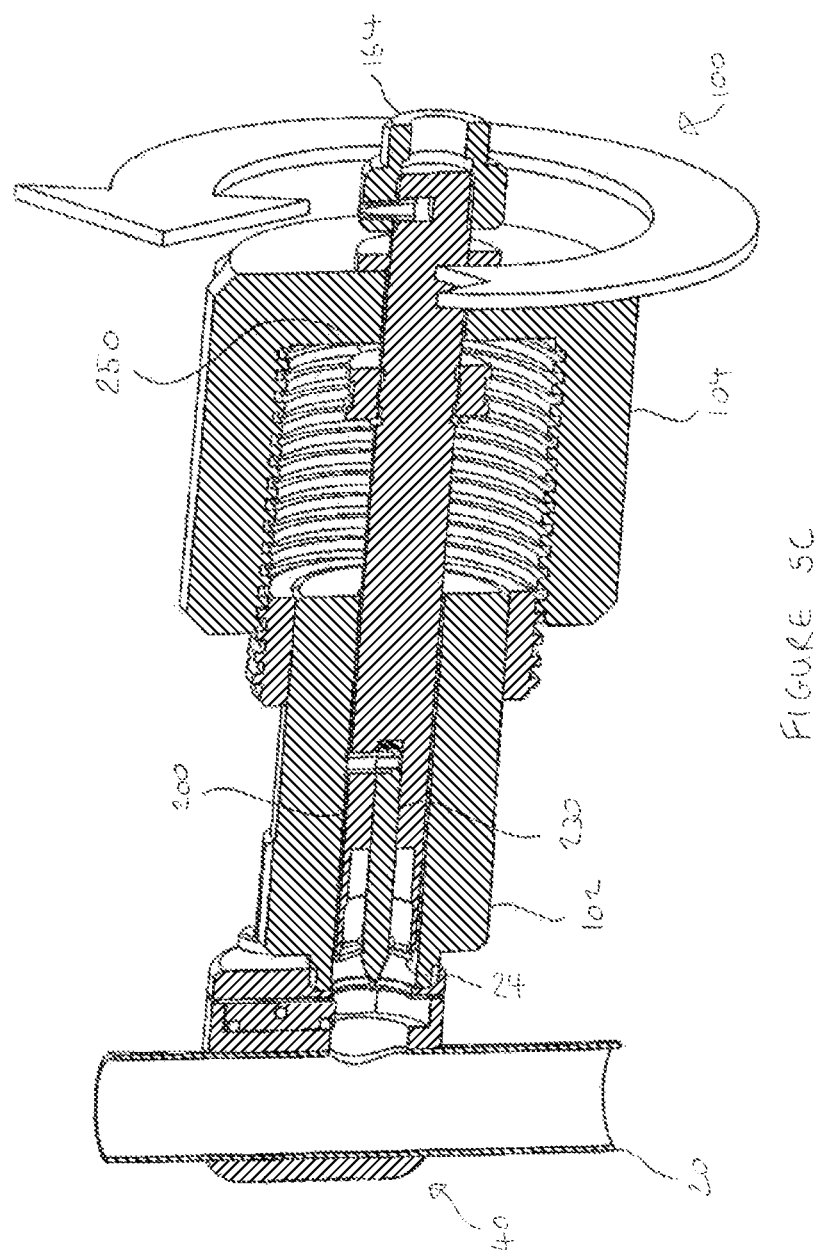

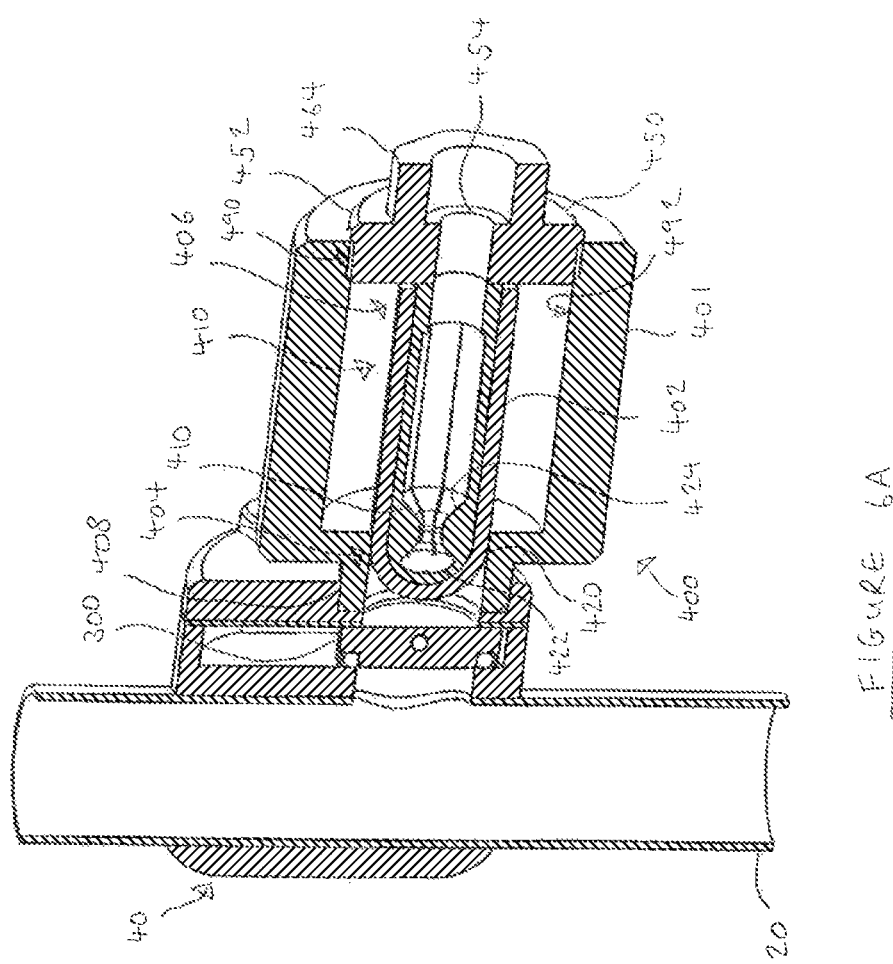

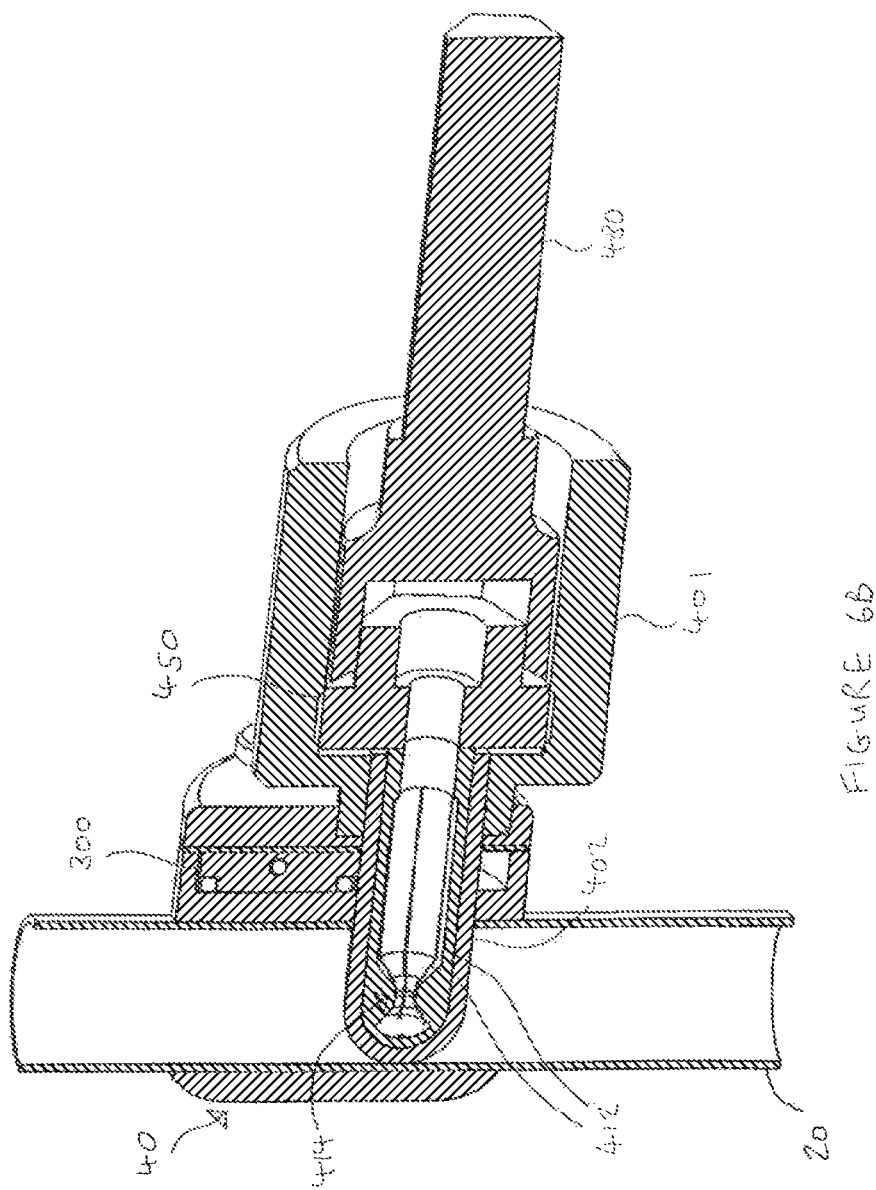

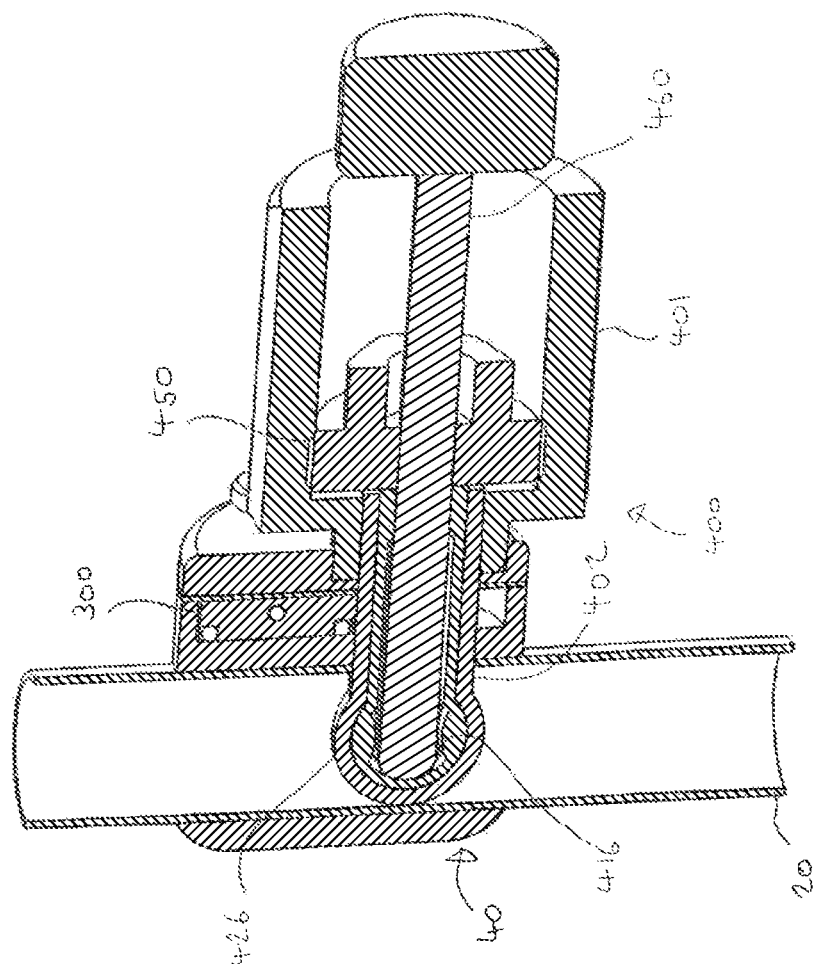

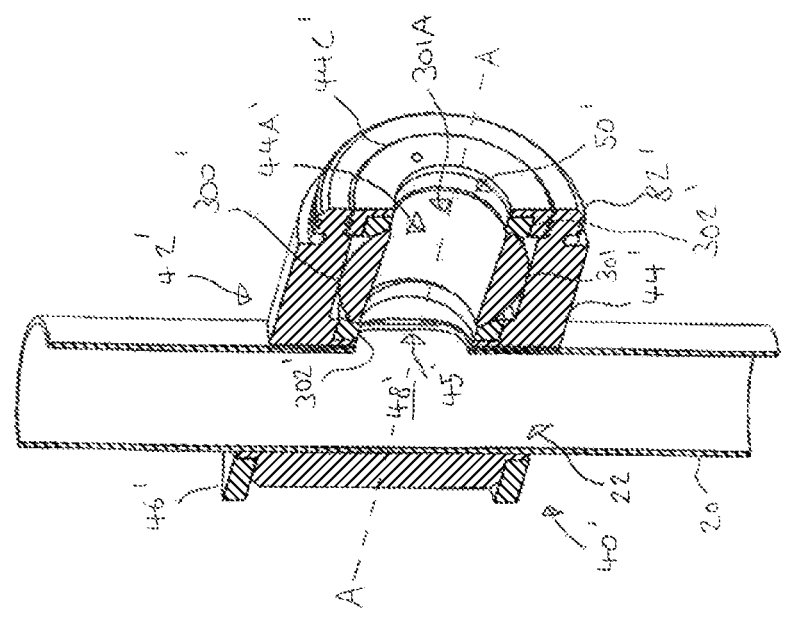
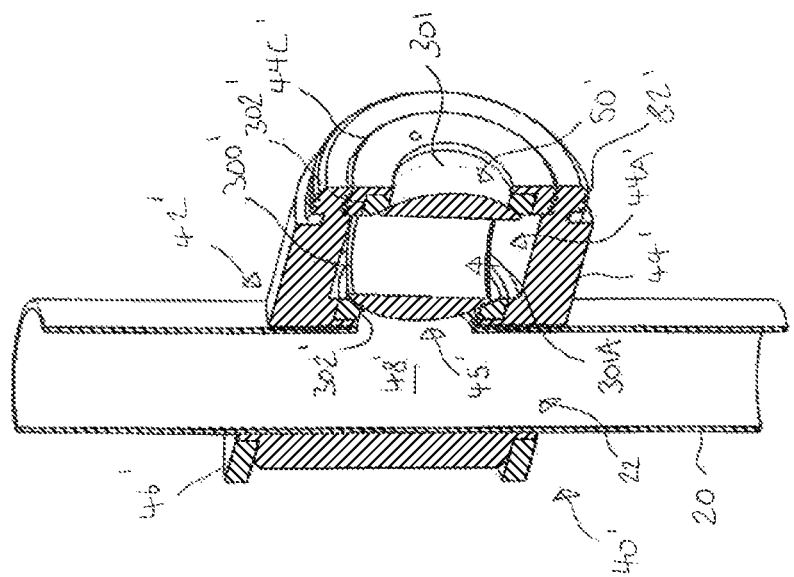

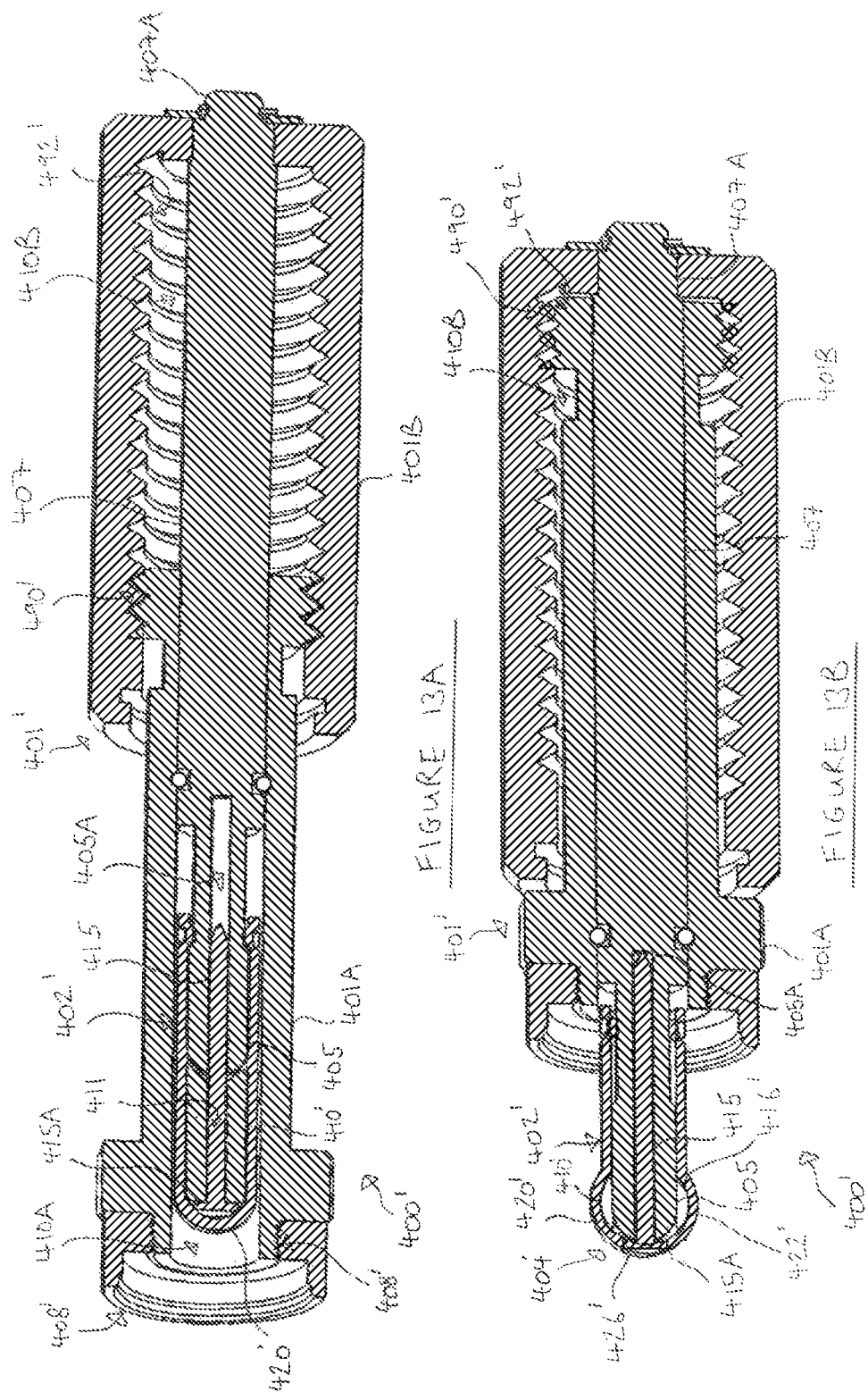

APPARATUS FOR BLOCKING FLUID FLOW THROUGH PIPES

CROSS-REFERENCE TO RELATED APPLICATIONS

This application is a national phase entry under 35 U.S.C. § 371 of International Patent Application PCT/GB2017/050362, filed Feb. 10, 2017, designating the United States of America and published in English as International Patent Publication WO 2017/141016 A2 on Aug. 24, 2017, which claims the benefit under Article 8 of the Patent Cooperation Treaty to Great Britain Patent Application Serial No. 1701402.8, filed Jan. 27, 2017, and to Great Britain Patent Application Serial No. 1602932.4, filed Feb. 19, 2016.

TECHNICAL FIELD

The present disclosure relates broadly to apparatus for use with pipes for conveying fluid (e.g., liquid or gas) and particularly, but not exclusively, to apparatus for repairing and upgrading pipes when in use conveying fluid (e.g., pressurized fluid).

BACKGROUND

A variety of techniques are known in the art for creating a temporary blockage in a pressurized pipe conveying fluid to allow repair or upgrading of the pipe (e.g., to allow a control mechanism such as an isolation valve or thermostatically controlled valve to be inserted downstream of the temporary blockage).

Traditionally, the process of introducing a temporary blockage has been by virtue of freezing the pipe to form an ice "plug" to block flow through the pipe. However, this technique is not suited to pipes conveying fluids such as oil or gas and only offers a limited period of blockage before the ice plug melts with the potential for disastrous failure if the ice plug gives way. Furthermore, the pipe must generally be cold to form the plug, thereby requiring heating systems in need of repair to cool before the plug can be formed.

A variety of solutions have been conceived to solve the problem, including the arrangements disclosed in GB 2344396, U.S. Pat. No. 3,532,113, U.S. Pat. No. 5,316,037, U.S. Pat. No. 3,687,166 and WO 2011/012899. All of these documents disclose arrangements incorporating a "pipe cutting tool and valve" all-in-one solution in which the cutting device is left in place along with the valve installed in the pipe. As will be appreciated, this can add to the cost of the device and result in a valve that is larger than desired.

BRIEF SUMMARY

The present applicant has identified the need for improved apparatus for repairing and upgrading pipes that is physically more compact and cheaper to install than arrangements known in the prior art. Furthermore, the present applicant has identified the need for improved apparatus for use with hot and cold pressurized pipes for conveying pressurized fluid such as water, oil, gases and refrigerants.

In accordance with a first aspect of the present disclosure, there is provided apparatus for repairing or upgrading a pipe conveying a fluid, comprising: a (e.g., sealed or sealable) housing configured to enclose a portion of a pipe, the housing comprising: a first part defining a housing chamber configured to receive the portion of the pipe; and a second part extending from the first part, the second part defining a stowage space adjacent the housing chamber; and an advanceable device movable along a device advancement path from a stowed position in the stowage space to an advanced position at least partially in the housing chamber, the advanceable device comprising a body having a leading end defining a cutter for removing a section of the pipe enclosed by the housing as the advanceable device moves from the stowed position to the advanced position in order to form an opening in the pipe; wherein the housing comprises an access port for allowing passage of the advanceable device into the housing chamber and a sealing member configurable between a sealed configuration sealing the access port and an unsealed configuration unsealing the access port and allowing the advanceable device to enter the access port.

In this way, apparatus is provided that can puncture a pipe while allowing the advanceable device to be withdrawn from the housing while maintaining a fluid seal. Advantageously, the apparatus can be used while pipework is hot and left in place until work on the pipe is complete.

In one embodiment, the advanceable device is a pipe cutter, a fluid flow control device or a flow blockage device.

In one embodiment, the access port is located in the first part.

In one embodiment, the second part comprises a collar configured to form a sealed connection with the first part when the advanceable device is in the stowed position and to be removable from the first part when the advanceable device is in the advanced position. In this way, only the first part of the housing need be left in place on the pipework to seal the pipe. The installation tool part (collar and advanceable device) may be reused and the only cost is the first part of the housing that is left in situ. If necessary, the first part can be re-used as an access point to re-block the same pipe again or to incorporate a valve (e.g., drainage valve, small bore isolator valve or tapping point).

In one embodiment, the sealing member is configured to move out of the device advancement path when moving from the sealed position to the unsealed position to allow the advanceable device to enter the housing chamber.

In one embodiment, the sealing member is constrained to prevent movement along the device advancement path when in the sealed configuration.

In one embodiment, the sealing member is constrained to move along a sealing face defined by the housing (e.g., defined by the first part of the housing).

In one embodiment, the sealing member comprises a rotatable body defining a flow/tool advancement passageway, the rotatable body being configured to rotate between the sealed position and the unsealed position (e.g., with the flow passageway being registered with the access port when in the unsealed position to allow flow/tool advancement through the rotatable body and to be orientated to substantially prevent flow/tool advancement through the rotatable body when in the sealed position).

In one embodiment, the apparatus includes a rotary actuator operative to move the sealing member between the sealed and unsealed position.

In one embodiment, the rotary actuator comprises a rotary member connected to the sealing member by a linkage (e.g., L-shaped linkage).

In one embodiment, the linkage comprises a first part rotatably mounted in the sealing member and a second part slidably mounted in the rotary member.

In one embodiment, the cutter is configured to rotate relative to the housing about an insertion axis as the flow blockage device moves from the stowed position to the installed position.

In one embodiment, the apparatus comprises: a rotary mechanism for rotating the cutter; and an axial force applicator operative independently of the rotary mechanism to apply an axial force to urge the cutter toward the pipe.

In one embodiment, the axial force applicator is operative to move the advanceable device axially toward the pipe.

In one embodiment, the axial force applicator is operative to generate an axial force in response to a rotary input.

In one embodiment, the axial force applicator comprises an outer sleeve defining a passageway for receiving at least a portion of the advanceable device, the outer sleeve and second part together defining a pair of interengaging screw-threaded portions for varying an axial position of the outer sleeve relative to the second part, whereby axial movement of the outer sleeve relative to the second part in a first direction applies an axial force urging the advanceable device toward the pipe.

In one embodiment, the axial force applicator further comprises a bearing (e.g., annular bearing) mounted on the body of the advanceable device, wherein the bearing is movable along the body in an axial direction and operative to transmit an axial force generated by axial movement of the outer sleeve relative to the second part to the body (e.g., by engaging a shoulder portion of the body).

In one embodiment, the leading end of the body includes a peripheral wall defining a cutting surface for removing a section of the pipe enclosed by the housing as the apparatus moves from the stowed position to the advanced position in order to form an opening in the pipe, the cutting surface being configured to rotate relative to the housing about the insertion axis as the advanceable device moves from the stowed position to the advanced position; the peripheral wall defines a central recess for receiving the cut section of pipe; and the advanceable device further comprises a central pipe-gripping element operative to hold a section of pipe removed by the cutting surface.

In one embodiment, the apparatus further comprises a drive mechanism for moving the advanceable device from the stowed position to the advanced position.

In one embodiment, the pipe-gripping element comprises a leading end defining pipe-puncturing part.

In one embodiment, the leading end comprises a drill tap part.

In one embodiment, the pipe-gripping element further comprises a screw-threaded part.

In one embodiment, the screw-threaded part has a tapered profile having a diameter that increases with increased distance from the leading end.

In one embodiment, the pipe-gripping element includes a pipe section collector (e.g., positioned to receive the section of pipe after the screw-threaded part has passed fully through the section).

In one embodiment, the pipe section collector is configured to disrupt alignment of a screw-thread formed in the section of pipe relative to the screw-threaded part (e.g., by allowing the section of pipe to change its angular and/or lateral orientation relative to the screw-threaded part). In this way, the section of pipe is likely to be held securely against a trailing end of the screw-threaded part if the direction of rotation of the advanceable device is accidentally reversed.

In one embodiment, the pipe section collector comprises a groove or shaft having a diameter less than a (e.g., maximum) root diameter of the screw-threaded portion.

In one embodiment, the cutting surface includes an inner edge inclined relative to the insertion axis by an acute angle to define a leading cutting end and a trailing cutting end with the cutting surface extending radially inward relative to the insertion axis with increased axial distance from the leading cutting end.

In one embodiment, the inner edge comprises at least one scalloped profile (e.g., a plurality of circumferentially spaced scalloped profiles).

In one embodiment, the pipe-gripping element is detachable from the advanceable device.

In accordance with a second aspect of the present disclosure, there is provided apparatus for repairing or upgrading a pipe conveying a fluid, comprising: a (e.g., sealed or sealable) housing configured to enclose a portion of a pipe, the housing comprising: a first part defining a housing chamber configured to receive the portion of the pipe; and a second part extending from the first part, the second part defining a stowage space adjacent the housing chamber; and an advanceable device movable along a device advancement axis from a stowed position in the stowage space to an advanced position at least partially in the housing chamber, the advanceable device comprising a body having a leading end and defining a cutter for removing a section of the pipe enclosed by the housing as the advanceable device moves from the stowed position to the advanced position in order to form an opening in the pipe; and a rotary mechanism for rotating the cutter; wherein the apparatus further comprises an axial force applicator operative independently of the rotary mechanism to apply an axial force to urge the cutter toward the pipe.

In this way, apparatus for repairing or upgrading a pipe is provided that allows independent application of an axial force and thereby efficient cutting of a range of different pipe materials and pipe thicknesses.

In one embodiment, the advanceable device is a pipe cutter, a fluid flow control device or a flow blockage device.

In one embodiment, the axial force applicator is operative to move the advanceable device axially toward the pipe.

In one embodiment, the axial force applicator is operative to generate an axial force in response to a rotary input.

In one embodiment, the axial force applicator comprises an outer sleeve defining a passageway for receiving at least a portion of the advanceable device, the outer sleeve and second part together defining a pair of interengaging screw-threaded portions for varying an axial position of the outer sleeve relative to the second part, whereby axial movement of the outer sleeve relative to the second part in a first direction applies an axial force urging the advanceable device toward the pipe.

In one embodiment, the axial force applicator further comprises a bearing mounted on the body of the advanceable device, wherein the bearing is movable along the body in an axial direction and operative to transmit an axial force generated by axial movement of the outer sleeve relative to the second part to the body (e.g., by engaging a shoulder portion of the body).

In one embodiment, the leading end of the body includes a peripheral wall defining a cutting surface for removing a section of the pipe enclosed by the housing as the apparatus moves from the stowed position to the advanced position in order to form an opening in the pipe, the cutting surface being configured to rotate relative to the housing about the insertion axis as the advanceable device moves from the stowed position to the advanced position; the peripheral wall defines a central recess for receiving the cut section of pipe; and the advanceable device further comprises a central pipe-gripping element operative to hold a section of pipe removed by the cutting surface.

In one embodiment, the advanceable device is a pipe cutter, a fluid flow control device or a flow blockage device.

In one embodiment, the apparatus further comprises a drive mechanism for moving the advanceable device from the stowed position to the advanced position.

In one embodiment, the pipe-gripping element comprises a leading end defining the pipe-puncturing part.

In one embodiment, the leading end comprises a drill tap part.

In one embodiment, the pipe-gripping element further comprises a screw-threaded part. In one embodiment, the screw-threaded part has a tapered profile having a diameter that increases with increased distance from the leading end.

In one embodiment, the pipe-gripping element includes a pipe section collector (e.g., positioned to receive the section of pipe after the screw-threaded part has passed fully through the section).

In one embodiment, the pipe section collector is configured to disrupt alignment of a screw-thread formed in the section of pipe relative to the screw-threaded part (e.g., by allowing the section of pipe to change its angular and/or lateral orientation relative to the screw-threaded part). In this way, the section of pipe is likely to be held securely against a trailing end of the screw-threaded part if the direction of rotation of the advanceable device is accidentally reversed.

In one embodiment, the pipe section collector comprises a groove or shaft having a diameter less than a (e.g., maximum) root diameter of the screw-threaded portion.

In one embodiment, the cutting surface includes an inner edge inclined relative to the insertion axis by an acute angle to define a leading cutting end and a trailing cutting end with the cutting surface extending radially inward relative to the insertion axis with increased axial distance from the leading cutting end.

In one embodiment, the inner edge comprises at least one scalloped profile (e.g., a plurality of circumferentially spaced scalloped profiles).

In one embodiment, the pipe-gripping element is detachable from the advanceable device.

In accordance with a third aspect of the present disclosure, there is provided apparatus for repairing or upgrading a pipe conveying a fluid, comprising: a (e.g., sealed or sealable) housing configured to enclose a portion of a pipe at a location where the opening is to be formed, the housing comprising: a first part defining a housing chamber configured to receive the portion of the pipe; and a second part extending from the first part, the second part defining a stowage space adjacent the housing chamber; and an advanceable device movable along an insertion axis from a stowed position in the stowage space to an advanced position in the housing chamber, the advanceable device comprising a body having a leading end including a peripheral wall defining a cutting surface for removing a section of the pipe enclosed by the housing as the apparatus moves from the stowed position to the advanced position in order to form an opening in the pipe, the cutting surface being configured to rotate relative to the housing about the insertion axis as the advanceable device moves from the stowed position to the advanced position; wherein: the peripheral wall defines a central recess for receiving the cut section of pipe; and the advanceable device further comprises a central pipe-gripping element operative to hold a section of pipe removed by the cutting surface.

In this way, apparatus for repairing or upgrading a pipe is provided in which a pipe section removed from the pipe is securely collected on the central pipe-gripping element, thereby preventing the pipe section being lost in the pipe system. This cutting arrangement lends itself equally well to scalloped-type blades for cutting clean holes in soft material (e.g., copper, plastic) as well as a toothed blade that cuts clean holes in harder and/or thicker pipes (e.g., galvanized steel water pipes).

In one embodiment, the advanceable device is a pipe cutter, a fluid flow control device or a flow blockage device.

In one embodiment, the apparatus further comprises a drive mechanism for moving the advanceable device from the stowed position to the advanced position.

In one embodiment, the pipe-gripping element comprises a leading end defining the pipe-puncturing part.

In one embodiment, the leading end comprises a drill tap part.

In one embodiment, the pipe-gripping element further comprises a screw-threaded part.

In one embodiment, the screw-threaded part has a tapered profile having a diameter that increases with increased distance from the leading end.

In one embodiment, the pipe-gripping element includes a pipe section collector (e.g., positioned to receive the section of pipe after the screw-threaded part has passed fully through the section).

In one embodiment, the pipe section collector is configured to disrupt alignment of a screw-thread formed in the section of pipe relative to the screw-threaded part (e.g., by allowing the section of pipe to change its angular and/or lateral orientation relative to the screw-threaded part). In this way, the section of pipe is likely to be held securely against a trailing end of the screw-threaded part if the direction of rotation of the advanceable device is accidentally reversed.

In one embodiment, the pipe section collector comprises a groove or shaft having a diameter less than a (e.g., maximum) root diameter of the screw-threaded portion.

In one embodiment, the cutting surface includes an inner edge inclined relative to the insertion axis by an acute angle to define a leading cutting end and a trailing cutting end with the cutting surface extending radially inward relative to the insertion axis with increased axial distance from the leading cutting end.

In one embodiment, the inner edge comprises at least one scalloped profile (e.g., a plurality of circumferentially spaced scalloped profiles).

In one embodiment, the pipe-gripping element is detachable from the advanceable device.

In accordance with a fourth aspect of the present disclosure, there is provided apparatus for temporarily blocking fluid flow through a pipe, comprising: a (e.g., sealed or sealable) housing configured to enclose a portion of a pipe through which fluid flow is to be blocked, the housing comprising: a first part defining a housing chamber configured to receive the portion of the pipe; and a second part extending from the first part, the second part defining a stowage space adjacent the housing chamber; a flow blockage device movable along an insertion axis from a stowed position in the stowage space through an aperture formed in one side of the pipe to an installed position in the housing chamber; and wherein the flow blockage device includes an outer sealing part, the outer sealing part being configurable when the flow blockage device is in the installed position between an unexpanded configuration allowing the flow blockage device to pass through the aperture and allowing fluid flow through the portion of pipe in the housing chamber between outer side surfaces of the flow blockage device and inner surfaces of the portion of pipe and an expanded configuration configured to block fluid flow through the portion of pipe in the housing chamber by substantially preventing passage of fluid between outer side surfaces of the flow blockage device and inner surfaces of the portion of pipe.

In one embodiment, the flow blockage device comprises a drive mechanism for moving the flow blockage device from the stowed position to the installed position.

In one embodiment, the outer sealing part comprises a resilient outer layer (e.g., outer sleeve).

In one embodiment, the outer sealing part is configured to expand laterally (e.g., radially) relative to the insertion axis (e.g., in response to insertion of an expansion pin or axial or torsional compression applied to the expandable inner structure).

In one embodiment, the outer sealing part comprises a pair of opposed inner surfaces configured to be radially outwardly displaced by an expansion pin advancing axially through the outer sealing part between the pair of opposed inner surfaces to cause radially outward expansion of outer surfaces of the outer sealing part.

In one embodiment, the pair of opposed inner surfaces are part of a continuous inner surface.

In one embodiment, each of the opposed inner surfaces has an inwardly curved profile.

In one embodiment, the flow blockage device further comprises an expandable inner part (e.g., configured to expand to cause radial outward displacement of the pair of opposed inner surfaces of the outer sealing part).

In one embodiment, the expandable inner part comprises an inner structure.

In one embodiment, the expandable inner structure comprises an expandable cage structure.

In one embodiment, the expandable cage structure comprises a plurality of axially extending struts spaced circumferentially relative to the insertion axis, whereby a central portion of each strut is configured to extend radially outward in response to an expansion force applied to the expandable cage structure (e.g., displacement by the advancing expansion pin or axial compression applied to the expandable inner structure). In another embodiment, the expandable cage structure comprises a plurality of helically orientated struts spaced circumferentially relative to the insertion axis, whereby a central portion of each strut is configured to extend radially outward in response to torsional compression (e.g., torque applied to unwind the helical orientation of the struts) of the expandable cage structure.

In one embodiment, the expandable inner part is configured to expand radially in response to axial compression (e.g., in response to a force applied by an expansion pin).

In one embodiment, the flow blockage device comprises an axial alignment member configured to maintain an axial alignment of the outer sealing part (e.g., to maintain alignment of the outer sealing part as the expandable inner part is expanded by, for example, insertion of an expansion pin). In the case of a flow blockage device including an expandable inner part, axial alignment member may be configured to maintain an axial alignment of the expandable inner part.

In one embodiment, the expandable inner part is configured to receive (e.g., slidingly receive) at least a part of the axial alignment member. For example, the expandable inner part may define a passageway (e.g., axially extending passageway) for snugly receiving at least a part of the axial alignment member.

In one embodiment, the axial alignment member comprises a pin.

In one embodiment, the axial alignment member is configured to limit axial travel of the expansion pin.

In one embodiment, the expansion pin is configured to receive (e.g., slidingly receive) at least a part (e.g., an end part) of the axial alignment member. For example, the expansion pin may define a passageway (e.g., axially extending passageway) for receiving at least a part of the axial alignment member.

In one embodiment, the expandable inner part and a leading end of the expansion pin have engageable profiles configured to generate a radial component of force in response to an axial force applied by the expansion pin.

In one embodiment, the expansion pin has a curved leading end.

In one embodiment, the outer sealing part has a length along the insertion axis that is greater than the internal diameter of the pipe when the external sealing part is in the unexpanded configuration and greater than or substantially equal to the internal diameter of the pipe when the outer sealing part is in the expanded configuration.

In one embodiment, the housing comprises an access port for allowing passage of the flow blockage device into the housing chamber and a sealing member configurable between a sealed configuration sealing the access port and an unsealed configuration unsealing the access port and allowing the flow blockage device to enter the access port.

In one embodiment, the access port is located in the first part.

In one embodiment, the second part comprises a collar configured to form a sealed connection with the first part when the flow blockage device is in the stowed position and to be removable from the first part when the flow blockage device is in the advanced position. In this way, only the first part of the housing need be left in place on the pipework to seal the pipe.

In one embodiment, the sealing member is configured to move out of the device advancement path when moving from the sealed position to the unsealed position to allow the flow blockage device to enter the housing chamber.

In one embodiment, the sealing member is constrained to prevent movement along the device advancement path when in the sealed configuration.

In one embodiment, the sealing member is constrained to move along a sealing face defined by the housing (e.g., defined by the first part of the housing).

In one embodiment, the sealing member comprises a rotatable body defining a flow/tool advancement passageway, the rotatable body being configured to rotate between the sealed position and the unsealed position (e.g., with the flow passageway being registered with the access port when in the unsealed position to allow flow/tool advancement through the rotatable body and to be orientated to substantially prevent flow/tool advancement through the rotatable body when in the sealed position).

In one embodiment, the apparatus includes a rotary actuator operative to move the sealing member between the sealed and unsealed position.

In one embodiment, the rotary actuator comprises a rotary member connected to the sealing member by a linkage (e.g., L-shaped linkage).

In one embodiment, the linkage comprises a first part rotatably mounted in the sealing member and a second part slidably mounted in the rotary member.

In accordance with a fifth aspect of the present disclosure, there is provided a flow blockage device comprising an outer sealing part, the outer sealing part being configurable when the flow blockage device is in an installed position in a pipe between an unexpanded configuration allowing fluid flow through the pipe between outer side surfaces of the flow blockage device and inner surfaces of the pipe and an expanded configuration configured to block fluid flow through the pipe by substantially preventing passage of fluid between outer side surfaces of the flow blockage device and inner surfaces of the pipe.

In one embodiment, the flow blockage device comprises a drive mechanism for moving the flow blockage device from the stowed position to the installed position.

In one embodiment, the outer sealing part comprises a resilient outer layer (e.g., outer sleeve).

In one embodiment, the outer sealing part is configured to expand laterally (e.g., radially) relative to the insertion axis (e.g., in response to insertion of an expansion pin or axial or torsional compression applied to the expandable inner structure).

In one embodiment, the outer sealing part comprises a pair of opposed inner surfaces configured to be radially outwardly displaced by an expansion pin advancing axially through the outer sealing part between the pair of opposed inner surfaces to cause radially outward expansion of outer surfaces of the outer sealing part.

In one embodiment, the pair of opposed inner surfaces are part of a continuous inner surface.

In one embodiment, each of the opposed inner surfaces has an inwardly curved profile. In one embodiment, the flow blockage device further comprises an expandable inner part (e.g., configured to expand to cause radial outward displacement of the pair of opposed inner surfaces of the outer sealing part).

In one embodiment, the expandable inner part comprises an inner structure.

In one embodiment, the expandable inner structure comprises an expandable cage structure.

In one embodiment, the expandable cage structure comprises a plurality of axially extending struts spaced circumferentially relative to the insertion axis, whereby a central portion of each strut is configured to extend radially outward in response to an expansion force applied to the expandable cage structure (e.g., displacement by the advancing expansion pin or axial compression applied to the expandable inner structure). In another embodiment, the expandable cage structure comprises a plurality of helically orientated struts spaced circumferentially relative to the insertion axis, whereby a central portion of each strut is configured to extend radially outward in response to torsional compression (e.g., torque applied to unwind the helical orientation of the struts) of the expandable cage structure.

In one embodiment, the expandable inner part is configured to expand radially in response to axial compression (e.g., in response to a force applied by an expansion pin).

In one embodiment, the flow blockage device comprises an axial alignment member configured to maintain an axial alignment of the outer sealing part (e.g., to maintain alignment of the outer sealing part as the expandable inner part is expanded by, for example, insertion of an expansion pin). In the case of a flow blockage device including an expandable inner part, the axial alignment member may be configured to maintain an axial alignment of the expandable inner part.

In one embodiment, the expandable inner part is configured to receive (e.g., slidingly receive) at least a part of the axial alignment member. For example, the expandable inner part may define a passageway (e.g., axially extending passageway) for snugly receiving at least a part of the axial alignment member.

In one embodiment, the axial alignment member comprises a pin.

In one embodiment, the axial alignment member is configured to limit axial travel of the expansion pin.

In one embodiment, the expansion pin is configured to receive (e.g., slidingly receive) at least a part (e.g., an end part) of the axial alignment member. For example, the expansion pin may define a passageway (e.g., axially extending passageway) for receiving at least a part of the axial alignment member.

In one embodiment, the expandable inner part and a leading end of the expansion pin have engageable profiles configured to generate a radial component of force in response to an axial force applied by the expansion pin.

In one embodiment, the expansion pin has a curved leading end.

In one embodiment, the outer sealing part has a length along the insertion axis that is greater than the internal diameter of the pipe when the external sealing part is in the unexpanded configuration and greater than or substantially equal to the internal diameter of the pipe when the outer sealing part is in the expanded configuration.

BRIEF DESCRIPTION OF THE DRAWINGS

Embodiments of the present disclosure will now be described by way of example with reference to the accompanying drawings, in which:

FIG. 3 is a schematic perspective view of the casing of FIG. 1 with the access port in the sealed position;

FIG. 4 is a schematic view of the pipe cutter installed in the removable pipe cutter installation tool of FIG. 1 in a fully advanced position;

FIG. 5A is a schematic cross-sectional view of the apparatus of FIG. 1 during a first stage of installation with the access port in an unsealed position to allow advancement of the pipe cutter to pierce the pipe;

FIG. 5C is a schematic cross-sectional view of the apparatus of FIG. 1 during removal of the pipe cutter;

FIG. 6A is a schematic cross-sectional view of the apparatus of FIG. 1 during a first stage of a subsequent installation of a flow blockage device in accordance with an embodiment of the present disclosure with the flow blockage device in an unexpanded configuration;

FIG. 6B is a schematic cross-sectional view of the apparatus of FIG. 1 during a second stage of installation of the flow blockage device with the flow blockage device in an unexpanded configuration;

FIG. 6C is a schematic cross-sectional view of the apparatus of FIG. 1 during a third stage of installation of the flow blockage device with the flow blockage device in an expanded configuration;

FIG. 11A is a schematic cross-sectional view of a first alternative casing in accordance with an embodiment of the present disclosure with the access port in a sealed position;

FIG. 11B is a schematic cross-sectional view of the first alternative casing of FIG. 11A with the access port in an unsealed position to allow advancement of the pipe cutter to pierce the pipe;

FIG. 13A is a schematic cross-sectional view of an alternative flow blockage device in accordance with an embodiment of the present disclosure with the flow blockage device in an unexpanded configuration; and FIG. 13B is a schematic cross-sectional view of the alternative flow blockage device of FIG. 13A in an expanded configuration.

FIGS. 1-5C show apparatus 10 for puncturing a pipe 20, apparatus 10 comprising a housing 40 and a removable pipe cutter installation tool 100 housing a pipe cutter 200.

DETAILED DESCRIPTION

Figure 1:
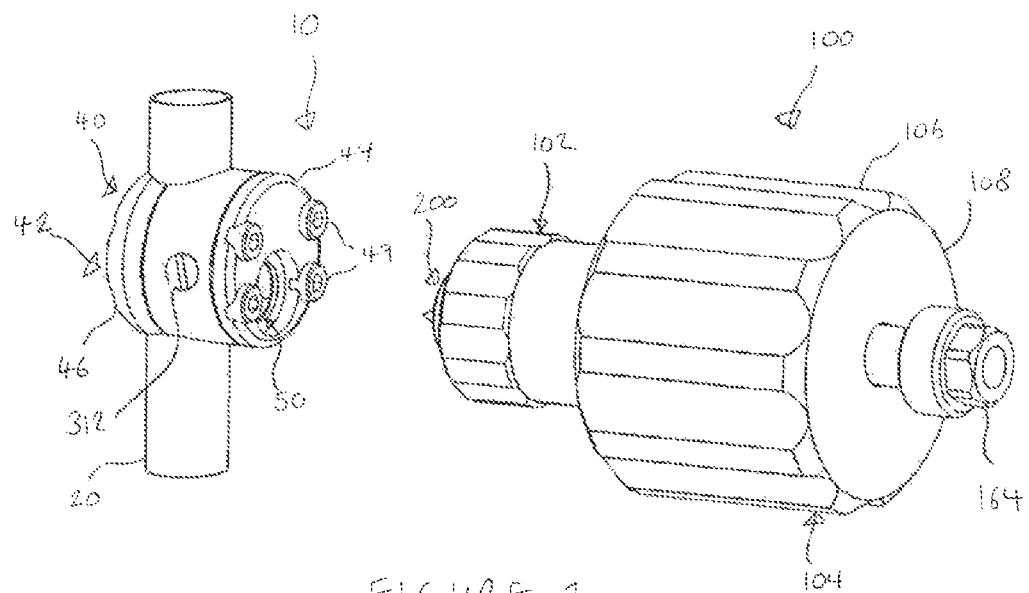
FIG. 1 is a schematic perspective view of an apparatus for puncturing a pipe in accordance with a first embodiment of the present disclosure, the apparatus including a housing with an access port for enclosing a region of pipe and a removable pipe cutter installation tool including a pipe cutter.

Housing 40 comprises a two-part casing 42 comprising an upper casing part 44 and lower casing part 46 configured to be clamped together by means of bolts 49 to enclose a portion 22 of pipe 20. Upper and lower casing parts 44, 46 together define an elongate cylindrical chamber 48 configured to receive the portion 22 of the pipe 20 (seals for sealing opposed ends of the chamber 48 when the housing 40 is installed around pipe 20 are omitted from the drawings for simplicity). Upper casing part 44 further defines a cylindrical passageway 45 extending from chamber 48 to an access port 50, cylindrical passageway 45 defining an insertion axis/device advancement path "A."

Figure 5B:
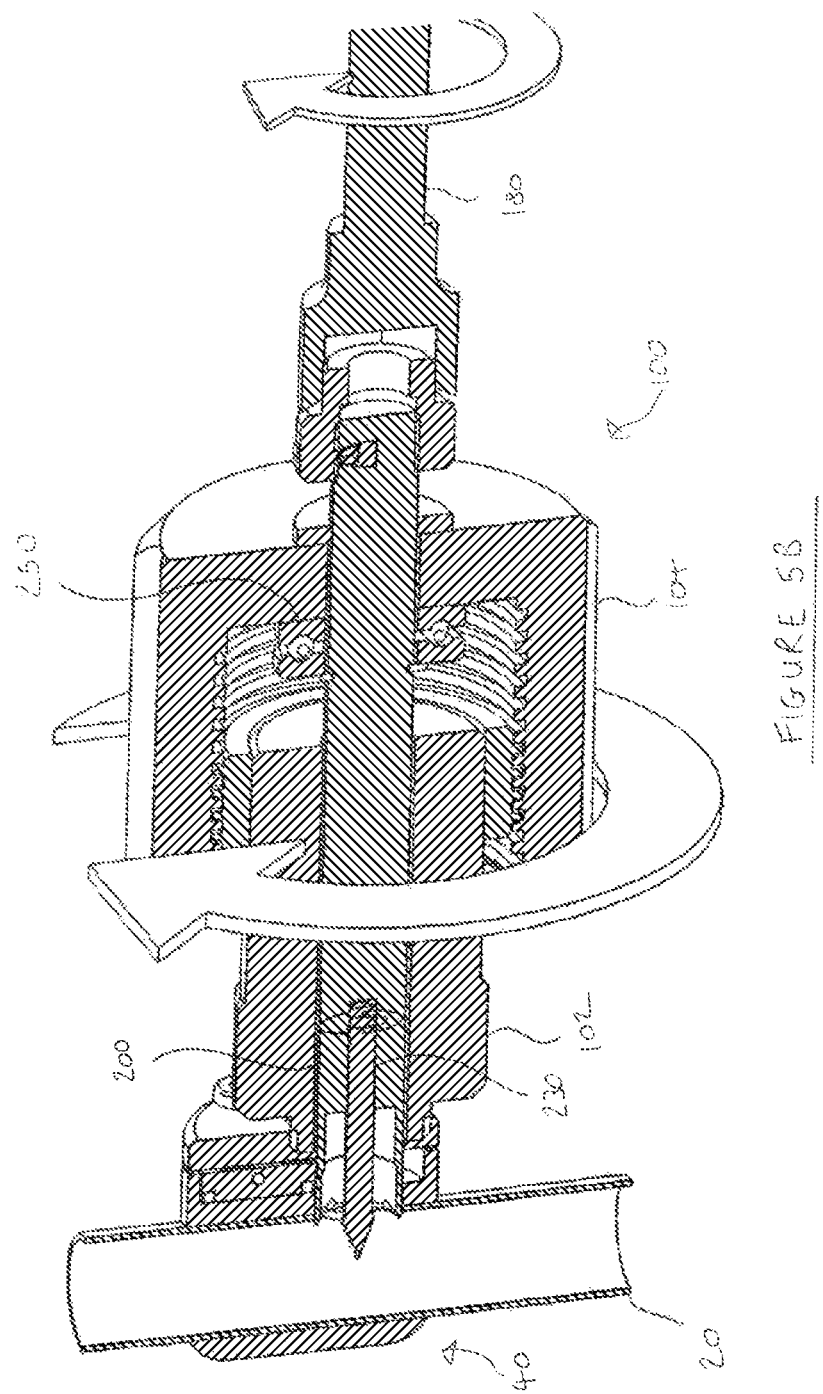
FIG. 5B is a schematic cross-sectional view of the apparatus of FIG. 1 during a second stage of installation in which a disc-like upper section of the pipe is cut from the pipe.
Figure 6D:
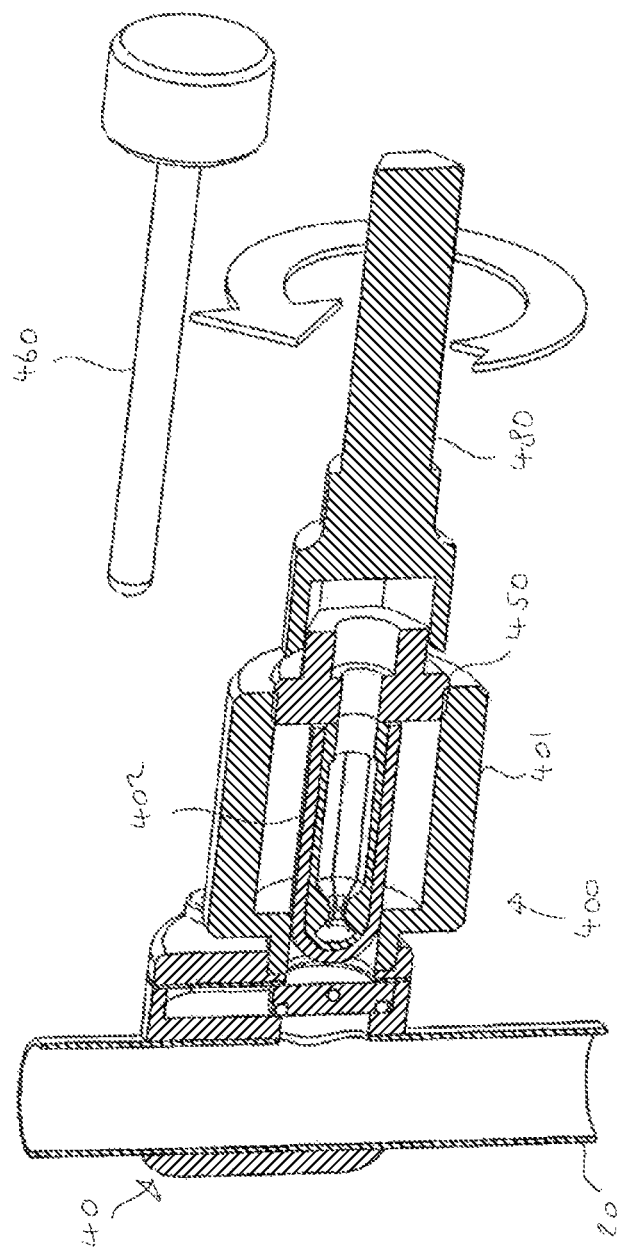
FIG. 6D is a schematic cross-sectional view of the apparatus of FIG. 1 with the flow blockage device being withdrawn from the housing with the flow blockage device returned to the unexpanded configuration.

Pipe cutter installation tool 100 comprises an inner collar part 102 and an outer collar part 104 comprising an outer sleeve 104 defining an external gripping surface 106 and an end plate 108. Together, inner collar part 102 and outer collar part 104 define a cylindrical stowage space 110 housing pipe cutter 200 when in a stowed position (as shown in FIG. 5C) and an axial force applicator 280. Inner collar part 102 and upper casing part 44 comprise interengaging screw-threaded portions 80, 82 for sealingly connecting pipe cutter installation tool 100 to the upper casing part 44.

Pipe cutter 200 comprises an elongate substantially cylindrical body 202 comprising a leading end 204 and a trailing end 206 having mounted thereon (by means of a grub screw 207) a hexagonal drive interface 240 for rotating/advancing pipe cutter 200 relative to pipe cutter installation tool 100. Pipe cutter 200 is linearly slidable within cylindrical stowage space 110 when inner and outer collar parts 102, 104 are positioned as illustrated in FIG. 5A allowing the operator to manually advance pipe cutter 200 relative to pipe 20.

As illustrated in FIG. 4, leading end 204 of cylindrical body 202 comprises: a peripheral wall 208 having a tapered profile decreasing in thickness as the peripheral wall 208 extends away from cylindrical body 202 and defines a cutting surface 210 for removing a disc-like upper section 24 of pipe 20 enclosed by housing 40; a central recess 220 for receiving the cut section of pipe 24; and a detachable central pipe-gripping element 230 operative to pierce and hold the section of pipe 24.

Cutting surface 210 comprises outer and inner cutting edges 212, 214 angled to define a tapered cutting profile including a leading cutting end 216 and a trailing cutting end 218. Inner cutting edge 212 incorporates a plurality of circumferentially spaced scalloped portions 219 to assist cutting of burr-free holes.

Pipe-gripping element 230 comprises a leading end 232 defining: pipe-puncturing part 234; a tapered screw-threaded part 236 having a diameter that increases with increased distance from leading end 232; and a disc collector shaft 238 positioned to receive the section of pipe 24 after screw-threaded part 236 has passed fully through the section of pipe 24. Disc collector shaft 238 has a diameter less than a maximum root diameter of screw-threaded part 236 and acts to disrupt alignment of a screw-thread formed in the section of pipe 24 relative to screw-threaded part 236 (e.g., by allowing the section of pipe 24 to change its angular and/or lateral orientation relative to screw-threaded part 236). As illustrated in FIG. 5A, pipe-gripping element 230 is attached to substantially cylindrical body 202 via a radially extending grub screw 239.

Axial force applicator 280 comprises: a pair of interengaging screw-threaded portions 282, 284 extending along an outer surface of inner collar part 102 and an inner surface of outer sleeve 104, respectively, for varying spacing between an upper surface 102A of inner collar part 102 and an underside 108A of end plate 108; and a thrust bearing 250 slidably mounted around an upper part of substantially cylindrical body 202, thrust bearing 250 comprising an upper surface 252 configured to be urged against underside 108A of end plate 108 of outer sleeve part 104 and a lower surface 254 configured to be urged against a radially extending shoulder region 203 of substantially cylindrical body 202 formed by circlip mounted in a groove in the body 202. Interengaging screw-threaded portions 282, 284 may comprise a square-type thread profile that lends itself to conversion of torque to linear thrust most efficiently reducing the effort of the operator.

Figure 2:
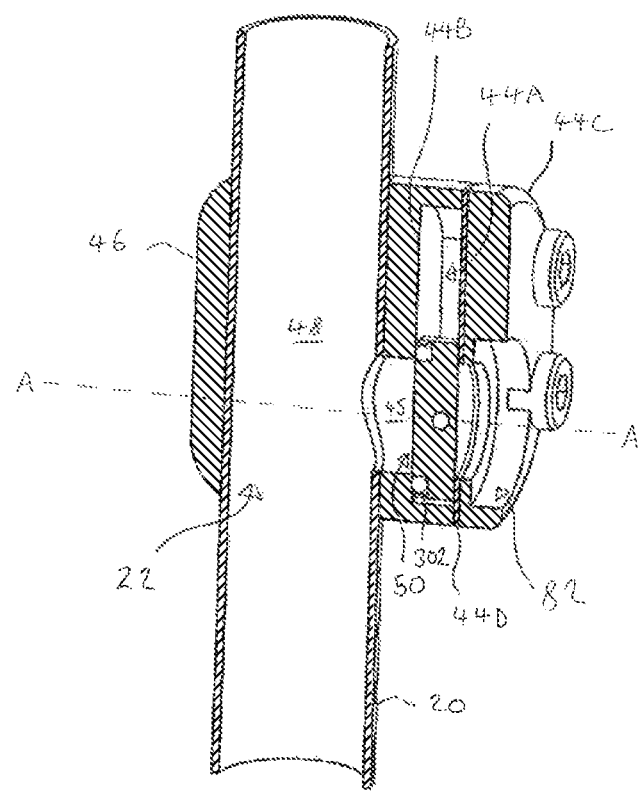
FIG. 2 is a schematic cross-sectional view of the casing of FIG. 1 with the access port in a sealed position.

As illustrated in FIGS. 2 and 3, upper casing part 44 comprises a slidable sealing member 300 mounted in a recess 44A formed in upper casing part 44 and constrained to move along a sealing face 44B of upper casing part 44 by an apertured outer plate 44C/apertured housing gasket 44D capping the recess. As illustrated, it is apertured outer plate 44C of upper casing part 44 that defines screw-threaded portion 82. Apertured outer plate 44C is clamped in position by bolts 49.

Sealing member 300 includes an O-ring seal 302 and is configured to move between a sealed position in which the sealing member 300 is fully registered with access port 50 in order to seal cylindrical passageway 45 and an unsealed position out of the device advancement path "A" to allow pipe cutter 200 to pass through access port 50 and enter cylindrical passageway 45. A rotary actuator 310 is provided to move the sealing member 300 between the sealed and unsealed position, rotary actuator 310 comprising a rotary member 312 accessible from the side of housing 40 and connected to sealing member 300 by an L-shaped lever linkage 320 (e.g., stiff wire or similar component) including a first leg 322 rotatably mounted in sealing member 300 and a second leg 324 extending substantially normal to the first leg 322 and slidably mounted in rotary member 312. Rotary member 312 includes a channel 314 for receiving a flat-headed screwdriver head and for acting as a visual marker for indicating whether sealing member 300 is in the sealed or unsealed position.

In use, apparatus 10 is fitted to a portion 22 of pipe 20 by attaching upper and lower casing parts 44, 46 around the portion 22 and clamping the upper and lower casing parts 44, 46 together using bolts 49. Once casing 42 is positioned around pipe 20, inner collar part 102 of pipe cutter installation tool 100 is connected to upper casing part 44 by means of interengaging screw-threaded portions 80, 82. If not already in the unsealed position, sealing member 300 is moved to the unsealed position (by rotating rotary member 312 to cause sealing member 300 to slide away from the sealed position) to allow entry to access port 50.

Once inner collar part 102 is connected to casing 42, pipe cutter 200 is deployed by simultaneously advancing and rotating hexagonal drive interface 164 using a socket driver 180 (e.g., electric drill-mounted socket driver) to allow the pipe-puncturing part to puncture pipe section 22 and tapered screw-threaded part to pass through the pipe.

As the leading cutting end of cutting surface 210 engages an upper surface of pipe 20, axial force applicator may be used to apply an additional axial force to assist cutting by the operator rotating by hand outer collar part 104 relative to inner collar 102. The large diameter of outer collar part 104 allows application of a large torque in a highly controlled manner causing cutting surface 210 to be forced against pipe 20. By providing independent application of an axial force, the apparatus gives the operator additional control to cut harder materials that require gradual linear advancement or to speed up the cut in the case of softer materials that can be more quickly cut with application of an additional axial force. As the cutting surface advances through the pipe 20, the pipe-gripping part acts to hold the section of pipe in place centrally in the pipe cutter 200. The pipe-gripping part is axially positioned relative to the cutting surface so that portion 22 moves from tapered screw-threaded part to disc collector shaft during the cutting step to ensure that the cut pipe portion 22 is not lost inside the pipework. The scalloped blade profiles advantageously act to cut a clean hole through the soft pipe material with the small external cutting edge, reducing burring on the rear side of the cut hole and the scallops acting to pare material by cleaving it from a radial direction as well as the advancing blade cleaving material from an axial direction. The internal acute angles complete the sharp edge.

Once portion 22 of pipe 20 has been removed from the pipe and collected on disc collector shaft, pipe cutter 200 is withdrawn from cylindrical passageway 45 by reversing the direction of rotation of outer collar part 104 and returned to the stowed position as illustrated in FIG. 5C. Access port 50 may then be sealed by rotating rotary member 312 to cause sealing member 300 to slide from the unsealed position to the sealed position to seal cylindrical passageway 45. Once access port 50 is sealed, pipe cutter installation tool 100 may be removed by rotating inner collar part 102 relative to housing 40 to disengage screw-threaded portions 80, 82. Pipe section 22 may be removed from pipe cutter installation tool 100 by moving inner collar part 102 into outer collar part 104 and advancing pipe cutter 200 to a reveal grub screw to allow removal of central pipe-gripping element 230. Advantageously, pipe portion 22 can slide from the end of disc collector shaft to avoid the need to pass the pipe portion 22 back over the screw-threaded portion.

Once pipe cutter installation tool 100 has been removed, a variety of ancillary apparatus may be installed in the pipe using the installed housing 40.

In a first embodiment, a flow blockage device 400 may be installed as illustrated in FIGS. 6A-6D.

Flow blockage device 400 comprises an outer collar 401 comprising an outer screw-threaded portion 408 configured to engage screw-threaded portion 82 on upper casing part 44. Outer collar 401 defines a cylindrical stowage space 410 housing a flow blockage insert 402 comprising a leading end 404, a trailing end 406 coupled to movable plug 450, a radially expandable inner cage 410 extending between the leading and trailing ends 404, 406, and a rubber outer sealing sleeve 420 having an axial length greater than the internal diameter of pipe 20.

Outer sealing sleeve 420 comprises an inner surface 422 defining an inwardly curved profile 424 configured to be radially displaced by an expansion pin 460 as it enters outer sealing sleeve 420 to form a substantially spherical outer bung profile 426 in the bore of pipe 20.

Expandable inner cage 410 comprises a plurality of axially extending struts 412 spaced circumferentially relative to the insertion axis "A" and defining an inwardly facing radially curved profile 414 extending in an opposing direction of the curvature of the pipe bore, whereby a central portion of each strut 412 is configured to extend radially outward in response to a radial displacement force resulting from axial movement of expansion pin 460 through expandable inner cage 410 to form an expanded profile 416 configured to resist internal system pressure from inside the pipework. It should be noted that expandable inner cage 410 is an optional feature. As an alternative to expandable inner cage 410, outer sealing sleeve may be supported in the expanded configuration by a rigid tube/and or the expansion pin 460 itself.

Movable plug 450 comprises a body 452 including a hexagonal drive interface 464 for rotating the movable plug 450 and an open bore 454 extending through body 452. An outer surface of movable plug 450 and inner surface of outer collar 401 define interengaging screw-threaded portions 490, 492 for allowing axial movement of movable plug 450 relative to outer collar 401 to advance flow blockage insert 402 through access port 50 and fully into chamber 48.

As illustrated in FIGS. 6B and 6C, once positioned in the fully advanced position in elongate cylindrical chamber 48, flow blockage insert 402 is alterable between a radially unexpanded configuration (FIG. 6B) and a radially expanded configuration (FIG. 6C) in which expandable inner cage 410 of outer sealing sleeve 420 expands in response to axial advancement of expansion pin 460.

Flow blockage device 400 is installed by connecting outer collar 401 to upper casing part 44 using interengaging screw-threaded portions 408, 82. Rotary member 312 is then rotated to move sealing member 300 from the sealed position to the unsealed position and flow blockage insert 402 is deployed in the unexpanded configuration by rotating hexagonal drive interface 464 using a socket driver 480. In response to a rotary input, rotary drive mechanism causes movable plug 450 and flow blockage insert 402 connected thereto to rotate and move linearly downward from the stowed position in outer collar 401, causing leading end 404 to pass through access port 50 into a fully installed position in chamber 48 as shown in FIG. 6B. When in the fully installed position, outer sealing sleeve 420 seals against the pair of opposed apertures in the pipe 20.

Once in the fully installed position, axial advancement of expansion pin 460 causes radial expansion of expandable inner cage 410 and stretching outer sealing sleeve 420 to generate a seal between outer lateral surfaces of outer sealing sleeve 420 and inner surfaces of cylindrical chamber 48 of two-part casing 42 (the expanded configuration of the flow blockage insert 402).

Once flow blockage insert 402 is installed in the expanded configuration, flow will be prevented from passing downstream of housing 40 to allow downstream repair or upgrading of the pipe. After work has been completed, flow blockage insert 402 may then be returned to the unexpanded configuration and withdrawn back into outer collar 401 by withdrawing expansion pin 460. Once returned to the stowed position, sealing member 300 may be returned to the sealed position and flow blockage device 400 removed from housing 40 by disengaging screw-threaded portions 408, 82.

Figure 7:
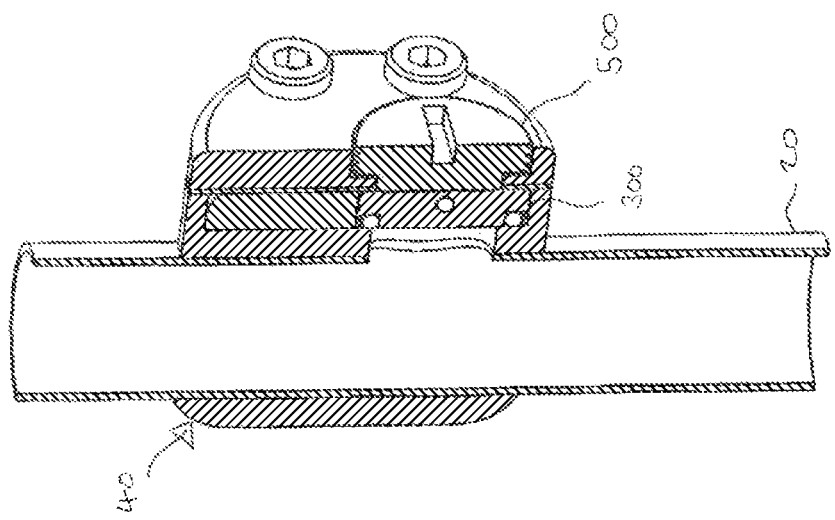
FIG. 7 is a schematic cross-sectional view of the housing of FIG. 1 when terminated by a cap.

As illustrated in FIG. 7, once flow blockage device 400 is removed from housing 40, the housing may be terminated by a screw-threaded cap 500 (e.g., to form a secondary seal) to complete the work on the pipe 20. Further blocking of pipe 20 may be achieved by removing cap 500 and redeploying flow blockage device 400 using the technique previously described.

Figure 8:
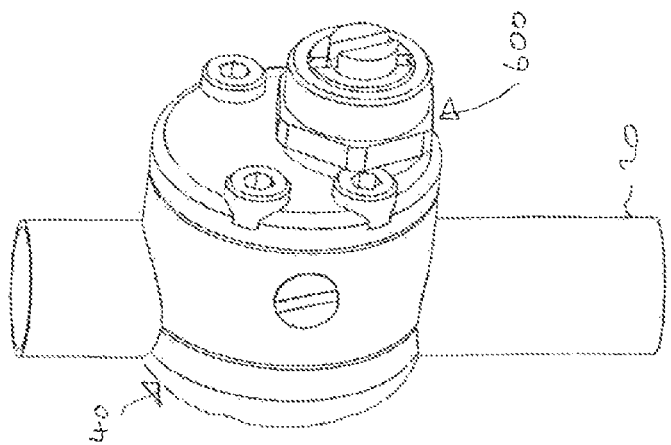
FIG. 8 is a schematic view of the housing of FIG. 1 when terminated by a flow control device.
Figure 9A:
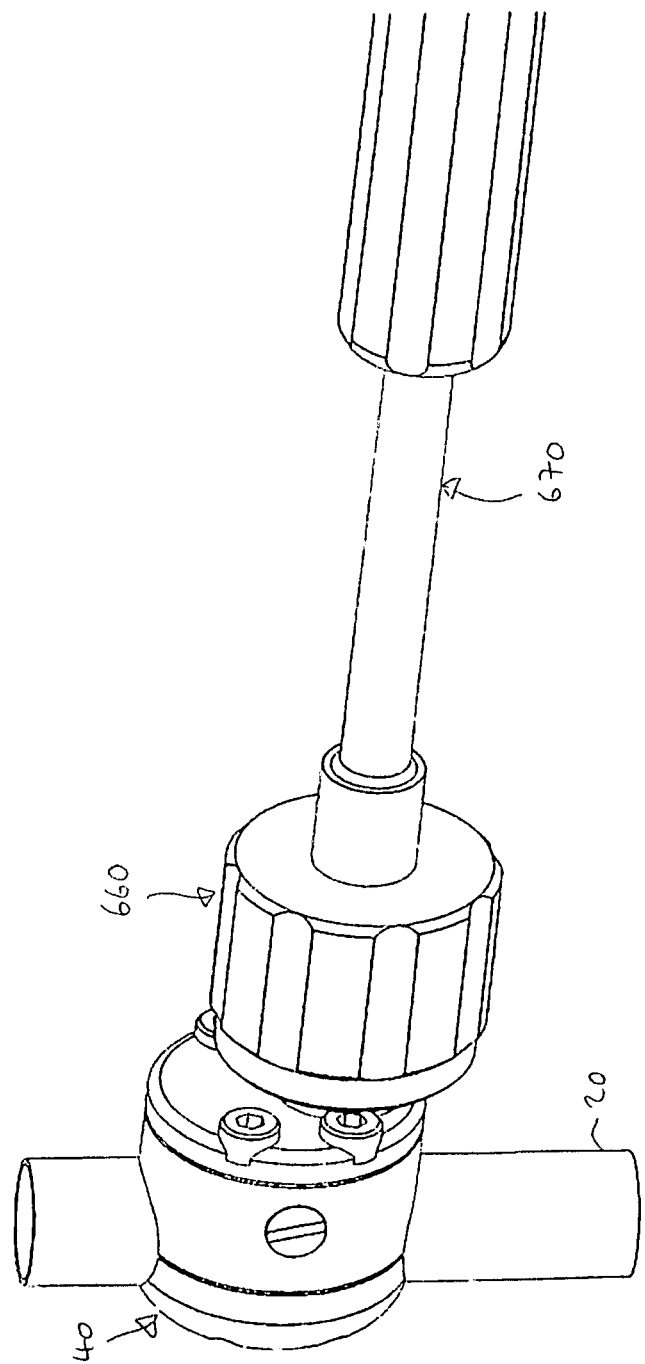
FIG. 9A is a schematic view of a flow control device installation tool used to install the flow control device in the housing of FIG. 1.
Figure 9B:
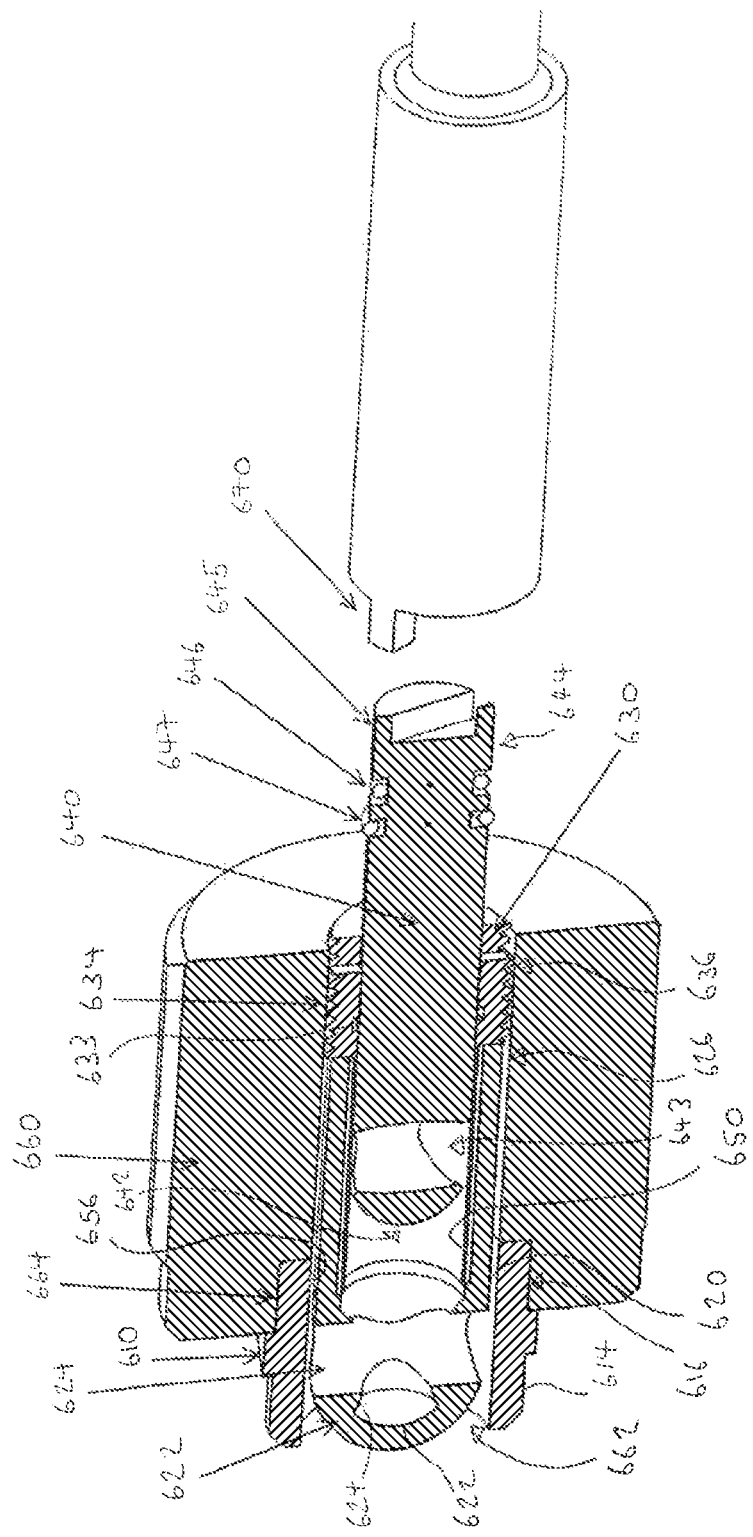
FIG. 9B is a schematic cross-sectional view of the flow control device installation tool during a first stage of installation in the housing of FIG. 1.
Figure 9C:
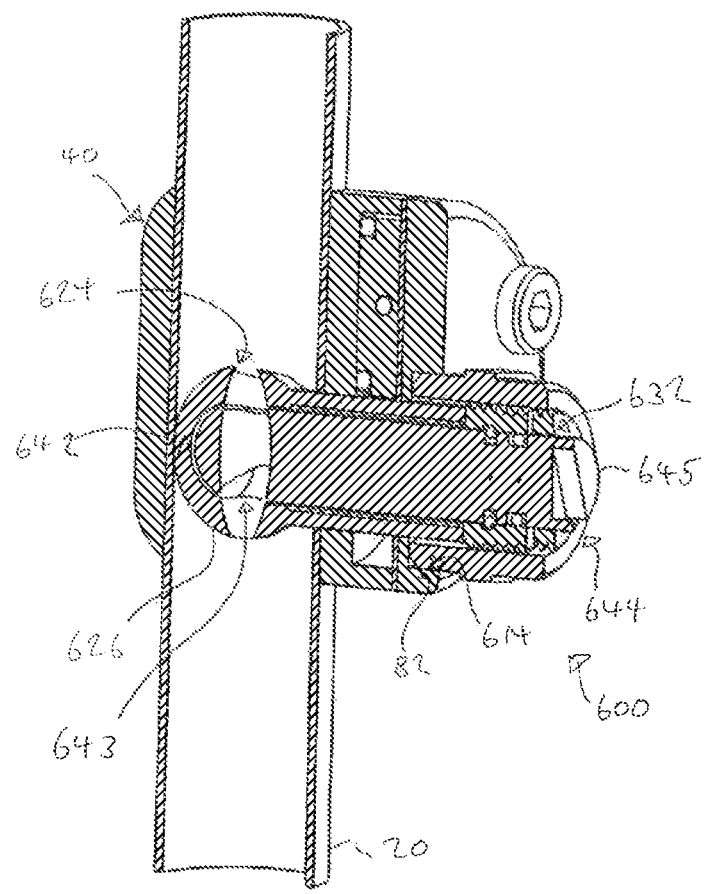
FIG. 9C is a schematic cross-sectional view of the flow control device when fully installed in the housing of FIG. 1.

FIGS. 8-9C illustrate a further alternative embodiment in which housing 40 is used to permanently install a flow control device 600.

Flow control device 600 is installed using a flow control device installation collar 660 defining a cylindrical stowage space 662 and an inner screw-threaded profile 664 and a rotary drive tool 670.

Flow control device 600 comprises: a mounting collar 610; a rubber outer sealing sleeve 620 comprising a leading end 622 defining an open bore 642 registrable with pipe 20 and a trailing end 644 coupled to a movable plug 630 defining an open bore 632 for slidably receiving a rotatable valve spindle 640 extending into outer sealing sleeve 620 and configured to rotate about insertion axis "A"; and a radially expandable inner cage 650 mounted on rotatable valve spindle 640.

Mounting collar 610 comprises an outer surface 612 with a leading screw-threaded profile 614 configured to interengage with screw-threaded profile 82 on upper casing part 44, a trailing screw-threaded profile 616 configured to interengage with screw-threaded profile 664 on flow control device installation collar 660, and an inner screw-threaded profile 656 configured to interengage with a screw-threaded profile 634 provided on an outer surface 636 of movable plug 630.

Outer sealing sleeve 620 comprises an inner surface 622 defining an inwardly curved profile 624 configured to be radially displaced by rotatable valve spindle 640 as it enters outer sealing sleeve 620 to form a substantially spherical outer bung profile 626 in the bore of pipe 20.

As shown in FIG. 9B, flow control device 600 is initially provided with flow control device installation collar 660 as a single unit with mounting collar 610 coupled to flow control device installation collar 660 by means of interengaging screw-threaded portions 616, 664 with outer sealing sleeve 620 and movable plug 630 substantially housed in cylindrical stowage space 662.

As illustrated in FIG. 9C, mounting collar 610 is mounted to upper casing part 44 using screw-threaded profiles 614, 82 allowing sealing member 300 to be moved from the sealed position to the unsealed position to gain access to passageway 45. Outer sealing sleeve 620 is then axially advanced fully into chamber 48 and secured in position by advancing movable plug 630 using rotary drive tool 670 until screw-threaded profiles 656 and 634 are fully engaged.

Once fully installed in chamber 48, outer sealing sleeve 620 is alterable between a radially unexpanded configuration (FIG. 9B) and a radially expanded configuration (FIG. 9C) in which expandable inner cage 650 and outer sealing sleeve 620 radially expand in response to axial advancement of rotatable valve spindle 640 through expandable inner cage 650 to generate a seal between outer lateral surfaces of outer sealing sleeve 620 and inner surfaces of cylindrical chamber 48 of two-part casing 42.

Rotatable valve spindle 640 includes: a leading end 642 defining an open bore 643 extending perpendicularly to insertion axis "A"; a trailing end 644 defining a rotary interface 645; an O-ring seal 646 for preventing passage of fluid past the trailing end 644; and a circlip 647 mounted in a groove 648. As rotatable valve spindle 640 is advanced into the fully installed position, circlip 647 engages a groove 633 provided in open bore 632 of movable plug 630 to lock rotatable valve spindle 640 in a fixed axial position relative to movable plug 630.

Once the flow control device 600 is in the installed position, rotatable valve spindle 640 is configurable between a first position (shown in FIG. 9C) for allowing fluid to pass through open bore 643 and a second position for substantially preventing fluid from passing through the open bore 643 in response to a 90-degree rotary input via rotary interface 645.

Figure 10A:
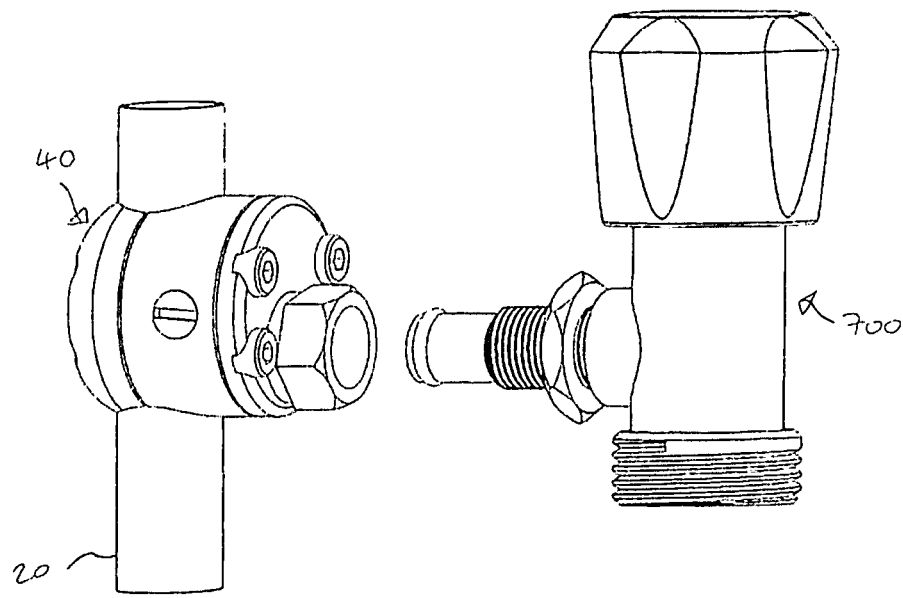
FIGS. 10A and 10B are schematic views of the housing of FIG. 1 illustrating attachment of an external tap.
Figure 10B:
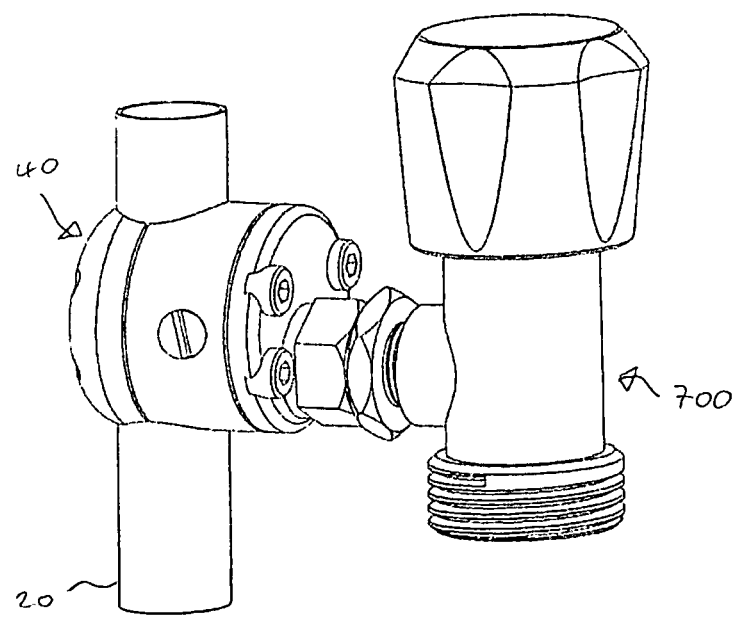

FIGS. 10A and 10B show a further alternative embodiment in which upper casing part 44 is fitted with an external tap 700 (again using the screw-threaded profile 82 provided on upper casing part 44). Accordingly, the apparatus of the present disclosure may be used as a convenient way of adding a washing machine tap or radiator drain cock. Advantageously, the apparatus of the present disclosure allows provision of the external tap 700 without restricting the bore of pipe 20 or the tap itself, thereby allowing an improved flow rate compared to conventional self-cutting washing machine taps.

Figure 11C:
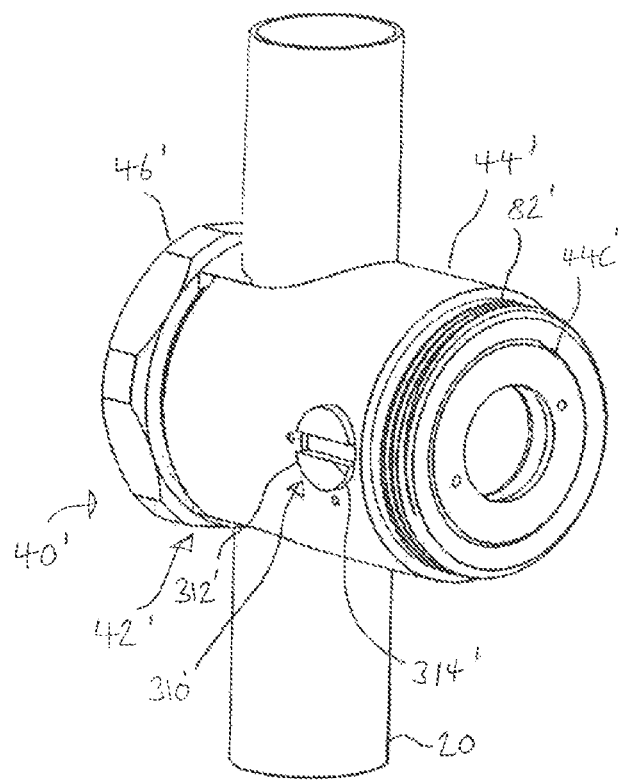
FIG. 11C is a schematic perspective view of the first alternative casing of FIG. 11A installed around a pipe.

FIGS. 11A-11C show a first alternative housing 40' for use in the system of the present disclosure instead of housing 40. Housing 40' comprises a two-part casing 42' comprising an upper casing part 44' defining an outer screw-threaded portion 82' for connecting to other system parts and a lower casing part 46' configured to be connected together to enclose a portion 22 of pipe 20. Upper and lower casing parts 44', 46' together define an elongate cylindrical chamber 48' configured to receive the portion 22 of the pipe 20 (seals for sealing opposed ends of the chamber 48' when the housing 40' is installed around pipe 20 are omitted from the drawings for simplicity). Upper casing part 44' further defines a cylindrical passageway 45' extending from chamber 48' to an access port 50', cylindrical passageway 45' defining an insertion axis/device advancement path "A."

As illustrated in FIGS. 11A and 11B, upper casing part 44' comprises rotary ball-type sealing member 300' mounted in a recess 44A' formed in upper casing part 44' and held in place by a screw-threaded cap member 44C'.

Ball-type sealing member 300' includes O-ring seals 302' and includes a ball-like body 301 configured to rotate between a sealed position in which an aperture 301A extending through the ball-like body 301 is fully out of registration with access port 50' in order to seal cylindrical passageway 45' and an unsealed position in which aperture 301A is fully registered with access port 50' to allow pipe cutter 200/flow blockage device 400 to pass through access port 50' and enter cylindrical passageway 45'.

As illustrated in FIG. 11C, a rotary actuator 310' is provided to rotate the ball-like body 301 between the sealed and unsealed position, rotary actuator 310' comprising a rotary member 312' accessible from the side of housing 40'. Rotary member 312' includes a channel 314' for receiving a flat-headed screwdriver head and for acting as a visual marker for indicating whether ball-type sealing member 300' is in the sealed or unsealed position.

Figure 12:
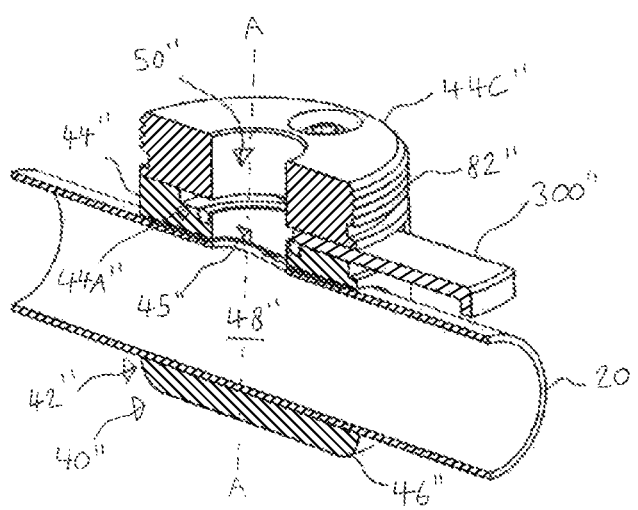
FIG. 12 is a schematic cross-sectional view of a second alternative casing in accordance with a further embodiment of the present disclosure with the access port in an unsealed position.

FIG. 12 shows a second alternative housing 40" for use in the system of the present disclosure instead of housing 40. Housing 40" comprises a two-part casing 42" comprising an upper casing part 44" and lower casing part 46" configured to be connected together to enclose a portion 22 of pipe 20. Upper and lower casing parts 44", 46" together define an elongate cylindrical chamber 48" configured to receive the portion 22 of the pipe 20 (seals for sealing opposed ends of the chamber 48" when the housing 40" is installed around pipe 20 are omitted from the drawings for simplicity). Upper casing part 44" further defines a cylindrical passageway 45" extending from chamber 48" to an access port 50", cylindrical passageway 45" defining an insertion axis/device advancement path "A."

Upper casing part 44" comprises a directly slidable sealing member 300" mounted in a recess 44A" formed in upper casing part 44" and constrained to move along a sealing face 44B" of upper casing part 44" by an apertured outer collar 44C" defining an outer screw-threaded portion 82" for connecting to other system parts.

Sealing member 300" is configured to move between a sealed position in which the sealing member 300" is fully registered with access port 50" in order to seal cylindrical passageway 45" and an unsealed position (shown in FIG. 12) out of the device advancement path "A" to allow pipe cutter 200/flow blockage device 400 to pass through access port 50" and enter cylindrical passageway 45".

FIGS. 13A and 13B show an alternative flow blockage device 400' for use in the system of the present disclosure in place of flow blockage device 400.

Flow blockage device 400' comprises a two-part outer collar 401' comprising a first collar part 401A and a second collar part 401B. First collar part 401A defines a first substantially cylindrical stowage space 410A for slidingly receiving a flow blockage insert 402' that is, in turn, slidably mounted on an expansion pin 405 (via a ferrule crimp on a narrowed section of the expansion pin) provided on a shaft 407 having a trailing end 407A attached in a fixed axial position to an upper end of second collar part 401B. Second collar part 401B defines a second substantially cylindrical stowage space 410B configured to receive first collar part 401A. First collar part 401A includes screw-threaded portions 408' configured to engage screw-threaded portion 82 on upper casing part 44 or screw-threaded portions 82, 82" on casing parts 44', 44".

An outer surface of first collar part 401A and inner surface of second collar part 401B define interengaging screw-threaded portions 490', 492' for allowing axial movement of first collar part 401A relative to second collar part 401B between an advanced position (as shown in FIG. 13A) in which flow blockage insert 402' is fully withdrawn inside first cylindrical stowage space 410A of first collar part 401A and a retracted position (as shown in FIG. 13B) in which a leading end 404' of flow blockage insert 402' extends axially from first collar part 401A (e.g., and through access port 50 and fully into chamber 48).

Flow blockage insert 402' comprises a radially expandable inner member 410' defining a first axially extending passageway 411 for receiving an axial alignment pin 415 with enlarged pinhead 415A, and a rubber outer sealing sleeve 420' having an axial length greater than the internal diameter of pipe 20. Flow blockage insert 402' is slidably mounted on expansion pin 405, which includes an axially extending blind bore 405A for receiving axial alignment pin 415. As illustrated in FIG. 13B, the length of travel of flow blockage insert 402' relative to expansion pin 405 is limited by axial alignment pin 415 reaching the end of blind bore 405A.

Outer sealing sleeve 420' comprises an inner surface 422' configured to be radially displaced by an expansion pin 405 as expansion pin 405 enters outer sealing sleeve 420' to form a substantially spherical outer bung profile 426' in the bore of pipe 20.

Radially expandable inner member 410' is configured to extend radially outward in response to axial movement of expansion pin 405 axially compressing radially expandable inner member 410' to form a radially expanded profile 416' configured to resist internal system pressure from inside the pipework.

Once positioned in the fully advanced position in elongate cylindrical chamber 48/48'/48", flow blockage insert 402' is alterable between a radially unexpanded configuration into the radially expanded configuration of FIG. 13B in which radially expandable inner member 410' and outer sealing sleeve 420' expand in response to axial advancement of expansion pin 405. Advantageously, flow blockage insert 402' may be quickly and efficiently installed since there is no need to advance a separate pin after installation of flow blockage device 400' and the rotational position of the insert is not important to the generation of the sealing action.

As with flow blockage device 400, after work has been completed, flow blockage insert 402' of flow blockage device 400' may then be returned to the unexpanded configuration and withdrawn back into first collar part 401A by withdrawing expansion pin 405. Flow blockage device 400' may then be subsequently removed from housing 40/40'/40" by disengaging screw-threaded portions 408' from portions 82/82'/82".

The invention claimed is:

1. A flow blockage device comprising an outer sealing part, the outer sealing part being configurable when the flow blockage device is in an installed position in a pipe between an unexpanded configuration allowing fluid flow through the pipe between outer side surfaces of the flow blockage device and inner surfaces of the pipe and an expanded configuration configured to block fluid flow through the pipe by substantially preventing passage of fluid between outer side surfaces of the flow blockage device and inner surfaces of the pipe; wherein the flow blockage device further comprises a radially expandable inner part configured to engage a pair of opposed inner surfaces of the outer sealing part and to expand to cause radial outward displacement of the pair of opposed inner surfaces of the outer sealing part.

2. The flow blockage device according to claim 1, wherein the outer sealing part comprises a resilient outer layer.

3. The flow blockage device according to claim 2, wherein the outer sealing part comprises a pair of opposed inner surfaces configured to be radially outwardly displaced by an expansion pin advancing axially through the outer sealing part between the pair of opposed inner surfaces to cause radially outward expansion of outer surfaces of the outer sealing part.

4. The flow blockage device according to claim 3, wherein each of the opposed inner surfaces has an inwardly curved profile.

5. The flow blockage device according to claim 1, wherein the flow blockage device further comprises an expandable inner part.

6. The flow blockage device according to claim 5, wherein the expandable inner part comprises an expandable cage structure.

7. The flow blockage device according to claim 1, wherein the flow blockage device comprises an axial alignment member configured to maintain an axial alignment of the outer sealing part.

8. A flow blockage device according to claim 1, wherein the expandable inner part is configured to expand radially in response to an axial compression force.

9. A flow blockage device according to claim 1, wherein the flow blockage device further comprises an axial alignment member configured to maintain an axial alignment of the expandable inner part.

10. A flow blockage device according to claim 9, wherein the expandable inner part defines an axially extending passageway for snugly receiving at least a part of the axial alignment member.

11. A flow blockage device according to claim 9, wherein the axial alignment member comprises an axial alignment pin.

12. A flow blockage device according to claim 11, wherein the axial alignment pin comprises an enlarged pin head.

13. A flow blockage device according to claim 9, wherein the expandable inner part is configured to expand radially in response to an axial compression force applied by an expansion pin.

14. A flow blockage device according to claim 13, wherein the axial alignment member is configured to limit axial travel of the expansion pin.

15. A flow blockage device according to claim 13, wherein the expansion pin defines an axially extending passageway for receiving at least a part of the axial alignment member.

16. A flow blockage device according claim 13, wherein the expandable inner part and a leading end of the expansion pin have engageable profiles configured to generate a radial component of force in response to an axial force applied by the expansion pin.

17. A flow blockage device according to claim 13, wherein the outer sealing part is slidably mounted on a leading end of the expansion pin.

18. Apparatus for temporarily blocking fluid flow through a pipe, comprising:
- a housing configured to enclose a portion of a pipe through which fluid flow is to be blocked, the housing comprising:
  - a first part defining a housing chamber configured to receive the portion of the pipe; and
  - a second part extending from the first part, the second part defining a stowage space adjacent the housing chamber;
- a flow blockage device movable along an insertion axis from a stowed position in the stowage space through an aperture formed in one side of the pipe to an installed position in the housing chamber; and
- wherein the flow blockage device is a flow blockage device in accordance with claim 1.

* * * * *